US012764276B2

(12) United States Patent
Fang et al.

(10) Patent No.: US 12,764,276 B2
(45) Date of Patent: Oct. 13, 2026

(54) SYSTEMS AND METHODS FOR IMAGE PROCESSING

(71) Applicant: ZHEJIANG DAHUA TECHNOLOGY CO., LTD., Hangzhou (CN)

(72) Inventors: Cheng Fang, Hangzhou (CN); Jucai Lin, Hangzhou (CN); Dong Jiang, Hangzhou (CN); Jun Yin, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 19/203,170

(22) Filed: May 9, 2025

(65) Prior Publication Data

US 2025/0267255 A1 Aug. 21, 2025

Related U.S. Application Data

(63) Continuation of application No. PCT/CN2023/132292, filed on Nov. 17, 2023.

(30) Foreign Application Priority Data

Nov. 21, 2022 (CN) ......................... 202211463047.2
Dec. 30, 2022 (CN) ......................... 202211743995.1

(51) Int. Cl.
*H04N 19/105* (2014.01)
*H04N 19/176* (2014.01)

(52) U.S. Cl.
CPC ......... *H04N 19/105* (2014.11); *H04N 19/176* (2014.11)

(58) Field of Classification Search
CPC .. H04N 19/105; H04N 19/176; H04N 19/154; G06V 10/751
See application file for complete search history.

(56) References Cited

U.S. PATENT DOCUMENTS 12,294,734 B2 * 5/2025 Chen .................... H04N 19/176
2004/0008771 A1 1/2004 Karczewicz
(Continued)

FOREIGN PATENT DOCUMENTS

CN 113691809 A 11/2021
CN 114938449 A 8/2022
(Continued)

OTHER PUBLICATIONS

Signe Sidwall Thygesen, Weighted Combination of Sample Based and Block Based Intra Prediction in Video Coding, (2016) In Master's Theses in Mathematical Sciences, 2016, 71 pages.
(Continued)

*Primary Examiner* — Richard T Torrente
(74) *Attorney, Agent, or Firm* — METIS IP LLC

(57) ABSTRACT

The present disclosure provides a system and a method for image processing. The system may include at least one storage device including a set of instructions; and at least one processor is in communication with the at least one storage device, wherein when executing the set of instructions, the at least one processor is directed to cause the system to perform operations, including: obtaining an image including a plurality of processed blocks and at least one block to be processed; for a block to be processed among the at least one block to be processed, determining at least two candidate blocks among the plurality of processed blocks; and determining a predicted value corresponding to the block to be processed based on the at least two candidate blocks.

17 Claims, 22 Drawing Sheets

500

(56) References Cited

U.S. PATENT DOCUMENTS

| | | | | |
|---|---|---|---|---|
| 2011/0170793 | A1 | 7/2011 | Sato et al. | |
| 2012/0288002 | A1 | 11/2012 | Shin et al. | |
| 2015/0350674 | A1 | 12/2015 | Laroche et al. | |
| 2016/0205409 | A1 | 7/2016 | Park et al. | |
| 2017/0223378 | A1 | 8/2017 | Tao et al. | |
| 2017/0339404 | A1 | 11/2017 | Panusopone et al. | |
| 2017/0353719 | A1 | 12/2017 | Liu et al. | |
| 2018/0241998 | A1* | 8/2018 | Chen .................... | H04N 19/109 |
| 2019/0014342 | A1 | 1/2019 | Li et al. | |
| 2019/0037217 | A1* | 1/2019 | Jin ....................... | H04N 19/139 |
| 2019/0364283 | A1 | 11/2019 | Venugopal et al. | |
| 2020/0228831 | A1 | 7/2020 | Heo et al. | |
| 2022/0210436 | A1* | 6/2022 | Jiang .................... | H04N 19/176 |
| 2024/0015292 | A1 | 1/2024 | Lee | |
| 2024/0022732 | A1* | 1/2024 | Chen .................... | H04N 19/159 |
| 2025/0080769 | A1* | 3/2025 | Chen .................... | H04N 19/523 |
| 2025/0392728 | A1 | 12/2025 | Jun et al. | |
| 2026/0106965 | A1 | 4/2026 | Andrivon et al. | |

FOREIGN PATENT DOCUMENTS

| | | | |
|---|---|---|---|
| CN | 116016929 | A | 4/2023 |
| CN | 116074536 | A | 5/2023 |
| JP | 2006031392 | A | 2/2006 |

OTHER PUBLICATIONS

Thiow Keng Tan et al., Intra Prediction by Averaged Template Matching Predictors, 2007 4th IEEE Consumer Communications and Networking Conference, 405-409, 2007.

Zhang, Yi et al., Adaptive Weighted Averaged Template Matching Prediction for Intra Coding, 2018 IEEE International Symposium On Circuits and Systems (ISCAS), 2018, 4 pages.

The Extended European Search Report in European Application No. 23893740.3 mailed on Oct. 22, 2025, 8 pages.

International Search Report in PCT/CN2023/132292 mailed on Jan. 24, 2024, 4 pages.

Written Opinion in PCT/CN2023/132292 mailed on Jan. 24, 2024, 5 pages.

Filippov, Alexey et al., CE3: Distance-Weighted Directional Intra Prediction (Tests 4.1.1 and 4.1.2), Joint Video Experts Team (JVET) of ITU-T SG 16 WP 3 and ISO/IEC JTC 1/SC 29/WG 11 12th Meeting: Macau, China, 2018, 4 pages.

Jung-Kyung Lee et al., AHG12: TMP Using Reconstruction-Reordered for Screen Content Coding (RR-TMP), JVET-AC0059-v1, 1-4, 2023.

Deng, Zhipin et al., EE2-3.2: Reconstruction-Reordered IBC for Screen Content Coding, JVET-AA0070-v3, 1-4, 2022.

Woong Lim et al., EE2-3.2: Using Block Vector Derived from IntraTMP for IBC, JVET-AB0061-v1, 1-3, 2022.

* cited by examiner

600

800

1600

1800

1900

SYSTEMS AND METHODS FOR IMAGE PROCESSING

CROSS-REFERENCE TO RELATED APPLICATIONS

This application is a Continuation of International Application No. PCT/CN2023/132292 filed on Nov. 17, 2023, which claims priority to Chinese Patent Application No. 202211463047.2, filed on Nov. 21, 2022, and Chinese Patent Application No. 202211743995.1, filed on Dec. 30, 2022, the entire contents of each of which are incorporated herein by reference.

TECHNICAL FIELD

The present disclosure generally relates to video encoding and decoding technology, and in particular, to systems and methods for image processing using intra prediction.

BACKGROUND

With the development of communication technologies, video compression (e.g., video coding) becomes more and more important for storage requirements or transmission requirements. For example, a traditional intra prediction manner is used to determine a predicted value of a current block based on a single processed block, which may be inaccurate or inefficient. Therefore, it is desirable to provide improved systems and methods for image processing using intra prediction, thereby improving the prediction accuracy and the compression efficiency.

SUMMARY

According to one embodiment of the present disclosure, a system for image processing is provided. The system includes at least one storage device including a set of instructions; and at least one processor in communication with the at least one storage device, wherein when executing the set of instructions, the at least one processor is directed to cause the system to perform operations including: obtaining an image including a plurality of processed blocks and at least one block to be processed; for a block to be processed among the at least one block to be processed, determining at least two candidate blocks among the plurality of processed blocks; and determining a predicted value corresponding to the block to be processed based on the at least two candidate blocks.

According to one embodiment of the present disclosure, a method for image processing is provided, the method is implemented on a computing device including at least one storage device and at least one processor. The method includes: obtaining the image including the plurality of processed blocks and the at least one block to be processed; for the block to be processed among the at least one block to be processed, determining at least two candidate blocks among the plurality of processed blocks; and determining the predicted value corresponding to the block to be processed based on the at least two candidate blocks. According to one embodiment of the present disclosure, a non-transitory computer readable medium is provided, the medium includes executable instructions that, when executed by at least one processor, direct the at least one processor to perform the method. The method includes: obtaining the image including a plurality of processed blocks and the at least one block to be processed; for the block to be processed among the at least one block to be processed, determining the at least two candidate blocks among the plurality of processed blocks; and determining the predicted value corresponding to the block to be processed based on the at least two candidate blocks.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
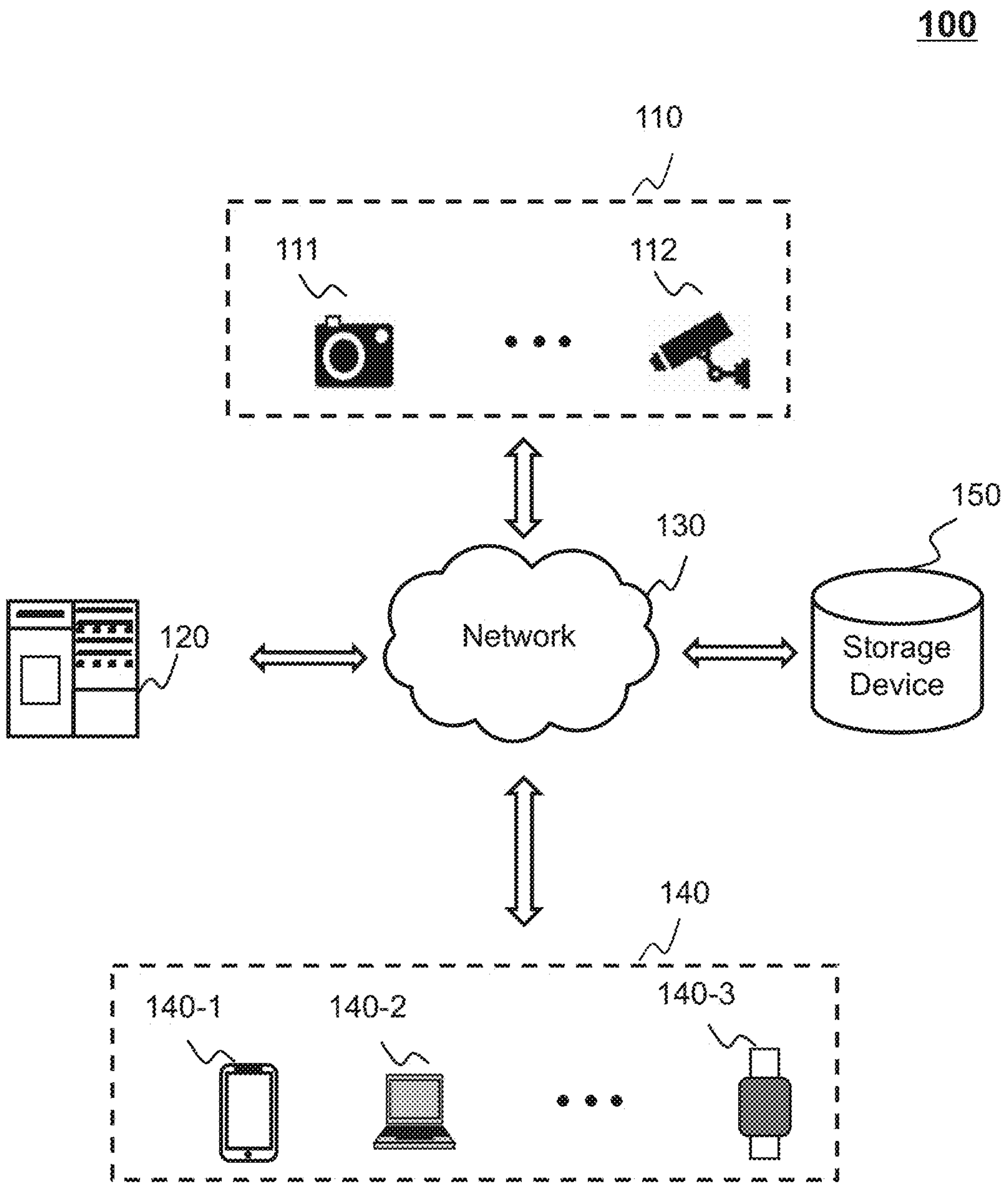
FIG. 1 is a schematic diagram illustrating an exemplary image processing system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms “system,” “engine,” “unit,” “module,” and/or “block” used herein are one method to distinguish different components, elements, parts, sections, or assemblies of different levels in ascending order. However, the terms may be displaced by other expression(s) if they may achieve the same purpose.

Generally, the words “module,” “unit,” or “block,” as used herein, refer to logic embodied in hardware or firmware, or to a collection of software instructions. A module, a unit, or a block described herein may be implemented as software and/or hardware and may be stored in any type of non-transitory computer-readable medium or other storage device(s). In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, engine, module, or block is referred to as being “on,” “connected to,” or “coupled to” another unit, engine, module, or block, it may be directly on, connected or coupled to, or communicate with the other unit, engine, module, or block, or an intervening unit, engine, module, or block may be present, unless the context clearly indicates otherwise. As used herein, the term “and/or” includes any and all combinations of one or more of the associated listed items.

The terminology used herein is for the purposes of describing particular examples and embodiments only and is not intended to be limiting. As used herein, the singular forms “a,” “an,” and “the” may be intended to include the plural forms as well, unless the context clearly indicates otherwise. It will be further understood that the terms “include” and/or “comprise,” when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In the present disclosure, a representation of an object (e.g., a person, a vehicle, a license plate, a road, a lane line) in an image may be referred to as an “object” for brevity. For instance, a representation of a license plate in an image may be referred to as a "license plate" for brevity. Further, an operation performed on a representation of an object in an image may be referred to as an "operation performed on the object" for brevity. For instance, an identification of a portion of an image including a representation of a lane line from the image may be referred to as an "identification of a lane line" for brevity.

An aspect of the present disclosure relates to a system and method for image processing. The system may obtain an image including a plurality of processed blocks and at least one block to be processed. For a block to be processed among the at least one block to be processed, the system may determine at least two candidate blocks among the plurality of processed blocks, and determine a predicted value corresponding to the block to be processed based on the at least two candidate blocks.

According to some embodiments of the present disclosure, at least two candidate blocks corresponding to a current block may be determined and block weights may be allocated for the at least two candidate blocks (e.g., according to cost values of the at least two candidate blocks). Further, a predicted value corresponding to the current block may be determined based on the at least two candidate blocks and the block weights thereof for encoding the current block. As more block information is used, the determined predicted value corresponding to the current block may be closer to the true value of the current block than a predicted value determined based on a single candidate block, thus the compression rate of the encoded bitstream of the current block and the decoded image quality of the current block can be efficiently improved.

FIG. 1 is a schematic diagram illustrating an exemplary image processing system according to some embodiments of the present disclosure. As illustrated in FIG. 1, the image processing system 100 may include an image acquisition device 110, a processing device 120, a network 130, a terminal device 140, and a storage device 150.

The image acquisition device 110 may be configured to capture an image or video. In some embodiments, the image acquisition device 110 may include a camera 111, a video acquisition device 112, or the like, or any combination thereof. In some embodiments, the image acquisition device 110 may transmit captured images or videos to one or more components (e.g., the processing device 120, the terminal device 140, the storage device 150) of the image processing system 100.

The processing device 120 may be a single server or a server group. The server group may be centralized or distributed (e.g., the processing device 120 may be a distributed system). In some embodiments, the processing device 120 may be local or remote. For example, the processing device 120 may access information and/or data stored in the image acquisition device 110, the terminal device 140, and/or the storage device 150 via the network 130. As another example, the processing device 120 may be directly connected to the image acquisition device 110, the terminal device 140, and/or the storage device 150 to access stored information and/or data. In some embodiments, the processing device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 120 may be implemented on a computing device 200 including one or more components illustrated in FIG. 2 of the present disclosure.

In some embodiments, the processing device 120 may process information and/or data relating to image processing to perform one or more functions described in the present disclosure. For example, the processing device 120 may obtain an image including a plurality of processed blocks and at least one block to be processed. For a block to be processed among the at least one block to be processed, the processing device 120 may determine at least two candidate blocks among the plurality of processed blocks. Further, the processing device 120 may determine a predicted value corresponding to the block to be processed based on the at least two candidate blocks. In some embodiments, the processing device 120 may include one or more processing devices (e.g., single-core processing device(s) or multi-core processor(s)). Merely by way of example, the processing device 120 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 130 may facilitate exchange of information and/or data for the image processing system 100. In some embodiments, one or more components (e.g., the processing device 120, the image acquisition device 110, the terminal device 140, the storage device 150) of the image processing system 100 may transmit information and/or data to other component(s) of the image processing system 100 via the network 130. For example, the processing device 120 may obtain the image from the image acquisition device 110 via the network 130. As another example, the processing device 120 may transmit an encoded image to the terminal device 140 via the network 130. In some embodiments, the network 130 may be any type of wired or wireless network, or combination thereof.

The terminal device 140 may be configured to receive information and/or data from the image acquisition device 110, the processing device 120, and/or the storage device 150 via the network 130. For example, the terminal device 140 may receive the encoded image from the processing device 120. In some embodiments, the terminal device 140 may process information and/or data received from the image acquisition device 110, the processing device 120, and/or the storage device 150 via the network 130. For example, the terminal device 140 may decode the encoded image received from the processing device 120 for display. In some embodiments, the terminal device 140 may provide a user interface via which a user may view information and/or input data and/or instructions to the image processing system 100. For example, the user may view the decoded image via the user interface. In some embodiments, the terminal device 140 may include a mobile phone 140-1, a computer 140-2, a wearable device 140-3, or the like, or any combination thereof.

The storage device 150 may be configured to store data and/or instructions. The data and/or instructions may be obtained from, for example, the image acquisition device 110, the processing device 120, the terminal device 140, and/or any other component of the image processing system 100. In some embodiments, the storage device 150 may store data and/or instructions that the processing device 120 may execute or use to perform exemplary methods described in the present disclosure. In some embodiments, the storage device 150 may include a mass storage, a removable storage, a volatile read-and-write memory, a read-only memory (ROM), or the like, or any combination thereof. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 130 to communicate with one or more components (e.g., the image acquisition device 110, the processing device 120, the terminal device 140) of the image processing system 100. One or more components of the image processing system 100 may access the data or instructions stored in the storage device 150 via the network 130. In some embodiments, the storage device 150 may be directly connected to or communicate with one or more components (e.g., the image acquisition device 110, the processing device 120, the terminal device 140) of the image processing system 100. In some embodiments, the storage device 150 may be part of other components of the image processing system 100, such as the image acquisition device 110, the processing device 120, or the terminal device 140.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more components of the image processing system 100 may be integrated into one component or be omitted. In some embodiments, one or more additional components may be added in the image processing system 100. Such variations are within the scope of the present disclosure.

Figure 2:
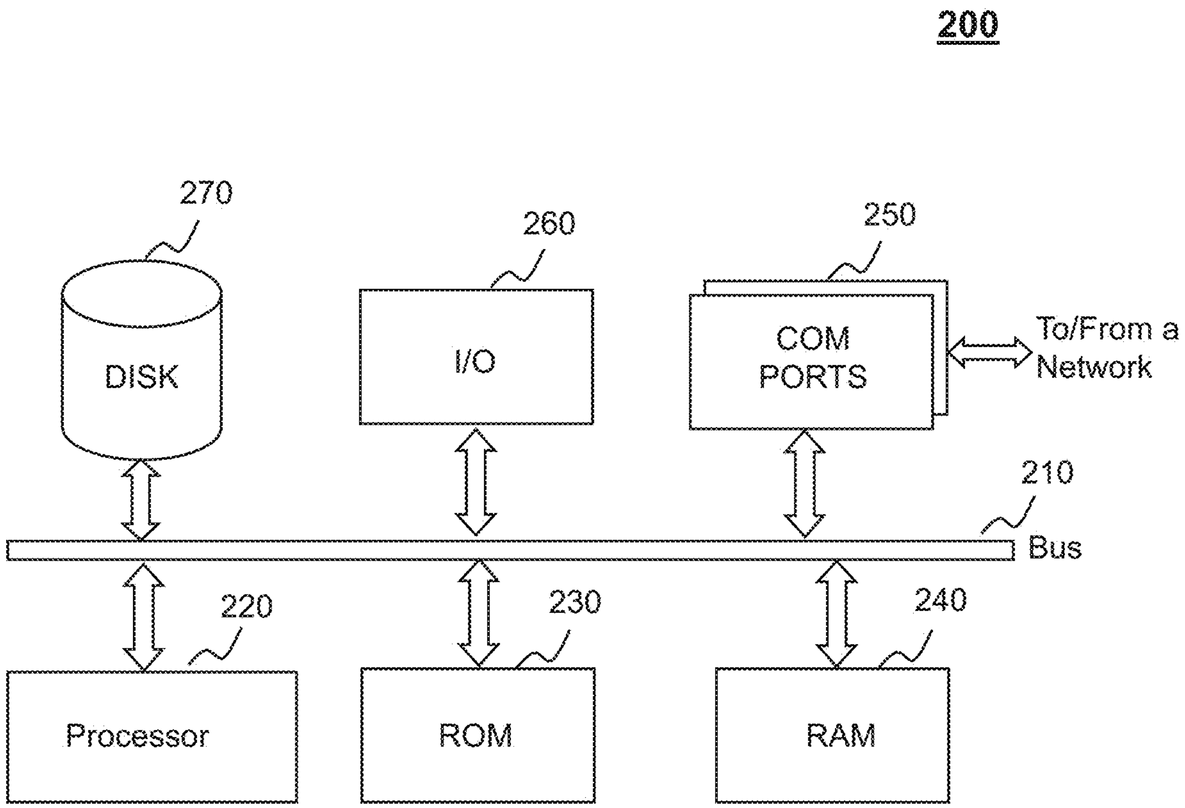
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the processing device 120 may be implemented on the computing device 200.

The computing device 200 may be used to implement any component of the image processing system 100 as described herein. For example, the processing device 120 may be implemented on the computing device 200, via its hardware, software program, firmware, or a combination thereof. Although only one such computer is shown, for convenience, the computer functions relating to image processing as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, a read-only memory (ROM) 230, or a random-access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors 220 jointly or separately in the computing device 200 (e.g., a first processor executes step A and a second processor executes step B, or the first and second processors jointly execute steps A and B).

Figure 3:
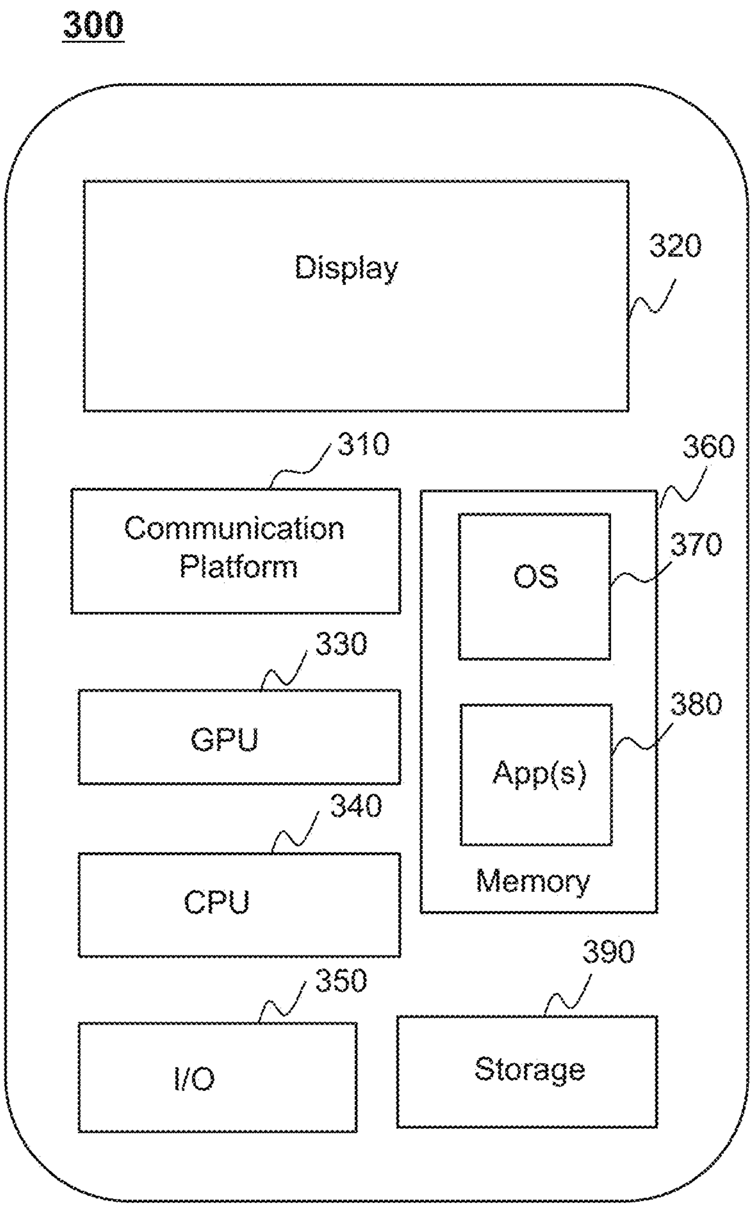
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the terminal device 140 may be implemented on the mobile device 300 shown in FIG. 3.

As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, an operating system (OS) 370 (e.g., iOS™, Android™, Windows Phone™) and one or more applications (Apps) 380 may be loaded into the memory 360 from the storage 390 in order to be executed by the CPU 340. The applications 380 may include a browser or any other suitable mobile apps for receiving and rendering information relating to image processing or other information from the processing device 120. User interactions may be achieved via the I/O 350 and provided to the processing device 120 and/or other components of the image processing system 100 via the network 130.

Figure 4:
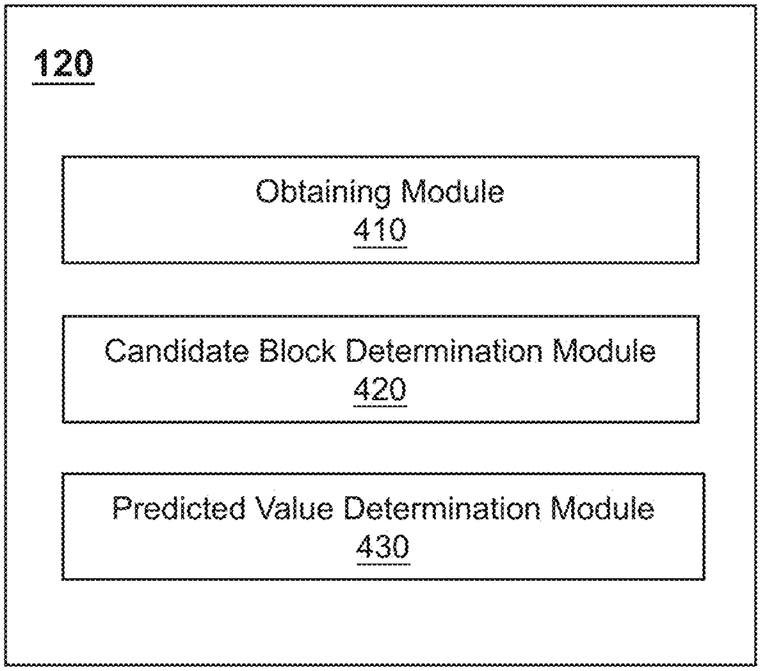
FIG. 4 is a block diagram illustrating an exemplary processing device according to some embodiments of the present disclosure.

FIG. 4 is a block diagram illustrating an exemplary processing device according to some embodiments of the present disclosure. As shown in FIG. 4, the processing device 120 may include an obtaining module 410, a candidate block determination module 420, and a predicted value determination module 430.

The obtaining module 410 may be configured to obtain data and/or information from one or more components of the image processing system 100. The obtaining module 410 may obtain an image (or a frame of a video) including a plurality of processed blocks and at least one block to be processed. More descriptions regarding the obtaining of the image, the processed blocks, and the block to be processed may be found elsewhere in the present disclosure.

The candidate block determination module 420 may be configured to determine at least two candidate blocks among the plurality of processed blocks. More descriptions regarding the determination of the at least two candidate blocks may be found elsewhere in the present disclosure (e.g., operation 520, FIGS. 6-18, and relevant descriptions thereof).

The predicted value determination module 430 may be configured to determine a predicted value corresponding to the block to be processed based on the at least two candidate blocks. More descriptions regarding the determination of the predicted value may be found elsewhere in the present disclosure (e.g., operation 530, FIGS. 19 and 20, and relevant descriptions thereof).

The modules in the processing device 120 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. In some embodiments, the processing device 120 may include one or more additional modules. For example, the processing device 120 may include an encoding module configured to encode the at least one block to be processed based on the predicted value(s) corresponding to the at least one block to be processed. As another example, the processing device 120 may include a communication module configured to transmit the encoded block(s) to one or more components (e.g., the terminal device 140) of the image processing system 100. As still another example, the processing device 120 may include a storage module (not shown) for storing information and/or data (e.g., the coded image or the coded block) generated by the processing device 120.

Figure 5:
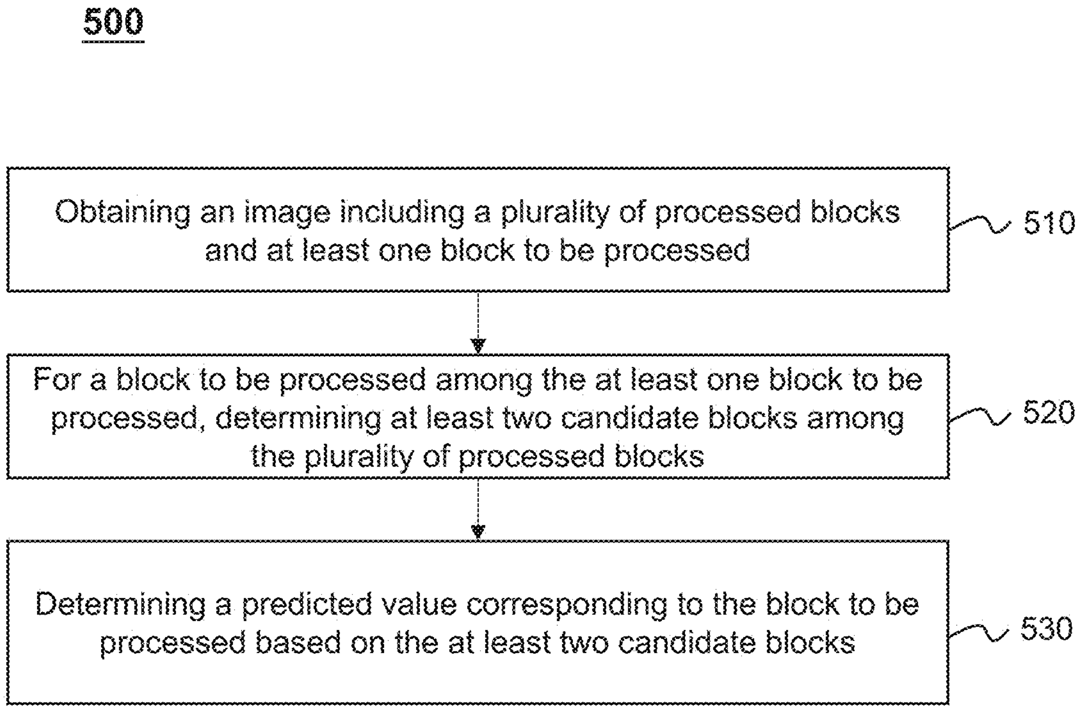
FIG. 5 is a flowchart illustrating an exemplary process for image processing according to some embodiments of the present disclosure.

FIG. 5 is a flowchart illustrating an exemplary process for image processing according to some embodiments of the present disclosure. In some embodiments, the image processing may include a process of intra prediction coding (or coding by intra prediction mode). In some embodiments, one or more operations in the process 500 may be implemented by the image processing system 100 illustrated in FIG. 1. For example, one or more operations in the process 500 may be stored in a storage device (e.g., the storage device 150, the ROM 230, the RAM 240, and/or the storage 390) as a form of instructions, and invoked and/or executed by the processing device 120 (e.g., the processor 220, the CPU 340, and/or one or more modules illustrated FIG. 4). The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 5 and described below is not intended to be limiting.

In 510, the processing device 120 (e.g., the obtaining module 410) may obtain an image including a plurality of processed blocks and at least one block to be processed.

In some embodiments, the image may include a discrete image or a video frame to be encoded. In some embodiments, the image may be divided into a plurality of blocks according to a coding order (e.g., from left to right and from top to bottom). In some embodiments, a block of the image may include a square block or a non-square block (e.g., a rectangle block). In some embodiments, a size of the block may be 4×4, 8×8, 16×8, 8×16, etc. In some embodiments, the sizes of the plurality of blocks may be the same or different. For example, the numbers (or counts) of the pixels included in the plurality of blocks may be the same or different. In some embodiments, the shapes of the plurality of blocks may be the same or different.

In some embodiments, the plurality of blocks may include the plurality of processed blocks and the at least one block to be processed. As used herein, a processed block may refer to a block that has been coded and includes a plurality of coded pixels, and a block to be processed may refer to a block to be coded (also referred to as a current block) and includes a plurality of un-coded pixels. In some embodiments, the number (or count) of the plurality of processed blocks may be the same as or different from the number (or count) of at least one block to be processed. In some embodiments, the sizes of the plurality of processed blocks may be the same as or different from the size(s) of the at least one block to be processed.

In some embodiments, the image may be stored in a storage device (e.g., the storage device 150, the ROM 230, the RAM 240, and/or the storage 390). The processing device 120 may retrieve the image from the storage device. In some embodiments, the image may be acquired by an image acquisition device (e.g., the image acquisition device 110). The processing device 120 may directly obtain the image from the image acquisition device.

In 520, for a block to be processed among the at least one block to be processed, the processing device 120 (e.g., the candidate block determination module 420) may determine at least two candidate blocks among the plurality of processed blocks.

As used herein, a candidate block refers to a processed block that is determined from the plurality of processed blocks and has a matching relation with the at least one block to be processed (e.g., the candidate block can be used for coding the at least one block to be processed). In some embodiments, the candidate block may also be referred to as a matching block.

In some embodiments, the processing device 120 may determine the at least two candidate blocks among the plurality of processed blocks for the block to be processed according to one or more processing modes (also referred to as searching modes).

For example, the processing device 120 may determine the at least two candidate blocks among the plurality of processed blocks for the block to be processed according to a first processing mode. The first processing mode may include determining a reference region (also referred to as a template region) of the block to be processed and determining the at least two candidate blocks among the plurality of processed blocks based on the reference region of the block to be processed, more descriptions of which can be found elsewhere in the present disclosure (e.g., FIGS. 6 and 7 and the relevant descriptions thereof).

As another example, the processing device 120 may determine the at least two candidate blocks among the plurality of processed blocks for the block to be processed according to a second processing mode. The second processing mode may include determining multiple processed blocks that are within a preset distance from the block to be processed and determining the at least two candidate blocks from the multiple processed blocks, more descriptions of which can be found elsewhere in the present disclosure (e.g., FIGS. 8 and 9 and the relevant descriptions thereof).

As still another example, the processing device 120 may determine the at least two candidate blocks among the plurality of processed blocks for the block to be processed according to a third processing mode. The third processing mode may include determining at least two reference regions of the block to be processed and determining the at least two candidate blocks based on the at least two reference regions, more descriptions of which can be found elsewhere in the present disclosure (e.g., FIGS. 10-17 and the relevant descriptions thereof).

In some embodiments, the processing device 120 may determine, based on the one or more processing modes, one or more intermediate blocks corresponding to each of the one or more processing modes among the plurality of processed blocks. Then the processing device 120 may determine the one or more intermediate blocks corresponding to each of the one or more processing modes as the at least two candidate blocks, more descriptions of which can be found elsewhere in the present disclosure (e.g., FIG. 18 and the relevant description thereof).

In 530, the processing device 120 (e.g., the predicted value determination module 430) may determine a predicted value corresponding to the block to be processed based on the at least two candidate blocks.

As used herein, the predicted value corresponding to the block to be processed may be used to encode the current block.

In some embodiments, the processing device 120 may determine block weights for the at least two candidate blocks and determine the predicted value corresponding to the block to be processed based on the block weights and the at least two candidate blocks. As used herein, a block weight corresponding to a candidate block may indicate a contribution degree of the candidate block in determining the predicted value corresponding to the block to be processed.

In some embodiments, the processing device 120 may determine the block weights for the at least two candidate blocks according to a difference value between each of the at least two candidate blocks and the block to be processed. As used herein, the difference value between a candidate block and the block to be processed may indicate a difference (e.g., a pixel difference) between the candidate block and the block to be processed. The smaller the difference value is, the smaller the difference between the candidate block and the block to be processed may be. In some embodiments, the processing device 120 may rank the at least two candidate blocks based on the difference values (e.g., cost values) of the at least two candidate blocks in ascending order or a descending order. As used herein, in ascending order, a candidate block corresponding to a small difference value is ranked before a candidate block corresponding to a great difference value; and in descending order, the candidate block corresponding to the small difference value is ranked after the candidate block corresponding to the great difference value. Then the processing device 120 may determine the block weights for the at least two candidate blocks based on the ranking result.

In some embodiments, the difference value may be determined based on at least one of a cost value of the candidate block or a distance between the candidate block and the block to be processed. As used herein, the cost value may reflect a difference between a candidate block and the block to be processed or a difference between a matching region (e.g., a processed region matching with the reference region) and the reference region of the block to be processed. Merely by way of example, the cost value may be denoted by a sum of absolute difference (SAD) between the matching region and the reference region. Alternatively, the cost value may be positively related to the SAD between the matching region and the reference region. More descriptions regarding the matching region and/or the reference region may be found elsewhere in the present disclosure (e.g., FIG. 6 and relevant description thereof).

In some embodiments, as described in connection with above, for each of the one or more processing modes, the processing device 120 may determine a block weight corresponding to each of one or more intermediate blocks that correspond to the processing mode. For each of the one or more processing modes, the processing device 120 may determine a mode weight corresponding to the processing mode. Then processing device 120 may determine the predicted value corresponding to the block to be processed by performing a weighting processing on the at least two candidate blocks based on the block weights corresponding to the one or more processing modes and the one or more mode weights corresponding to the one or more processing modes, more descriptions of which can be found elsewhere in the present disclosure (e.g., FIG. 19 and the description thereof).

In some embodiments, the processing device 120 may determine a plurality of weighting modes each of which corresponds to at least one of the one or more processing modes. For each of the plurality of weighting modes, the processing device 120 may determine a block weight of each of one or more intermediate blocks that correspond to the one or more processing modes, determine a mode weight corresponding to each of the one or more processing modes, and determine an intermediate predicted value corresponding to the block to be processed by performing, according to the weighting mode, a weighting processing on the at least two candidate blocks based on the block weights corresponding to the one or more processing modes and the one or more mode weights corresponding to the one or more processing modes. Then the processing device 120 may determine the predicted value corresponding to the block to be processed based on a plurality of intermediate predicted values corresponding to the plurality of weighting modes respectively, more descriptions of which can be found elsewhere in the present disclosure (e.g., FIG. 20 and the relevant description thereof).

In some embodiments, after the predicted value is determined, the processing device 120 (e.g., the encoding module thereof) may encode the block to be processed based the predicted value corresponding to the block to be processed into an encoded bitstream. In some embodiments, the encoded bitstream can reflect residual information between the block to be processed and the predicted value corresponding to the block to be processed. In some embodiments, the encoded bitstream may be transmitted to a receiving end (e.g., an encoder). The receiving end may decode the residual information in the encoded bitstream and determine the block to be processed based on the residual information and the predicted value corresponding to the coding block. More descriptions regarding the encoding and decoding can be found elsewhere in the present disclosure (e.g., FIG. 19 and FIG. 20 and relevant descriptions thereof).

According to the embodiments of the present disclosure, by obtaining the at least two candidate blocks and allocating block weights for the candidate blocks according to the difference between the candidate blocks and the block to be processed, the block to be processed can be predicted using more intra information. The predicted value corresponding to the block to be processed may be determined based on the candidate blocks and the block weights thereof, and the block to be processed may be encoded based on the predicted value. As the determined predicted value utilizes more candidate block information, the predicted value may be closer to the block to be processed than a predicted value which is determined based on a single candidate block, thereby the compression rate of the encoded bitstream and the image quality of the block to be processed obtained after decoding can be improved. In addition, by obtaining the predicted value using the one or more reference regions, more image information can be used for intra prediction.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, after operation 530, the process 500 may include an encoding operation for encoding the at least one block to be processed.

Figure 6:
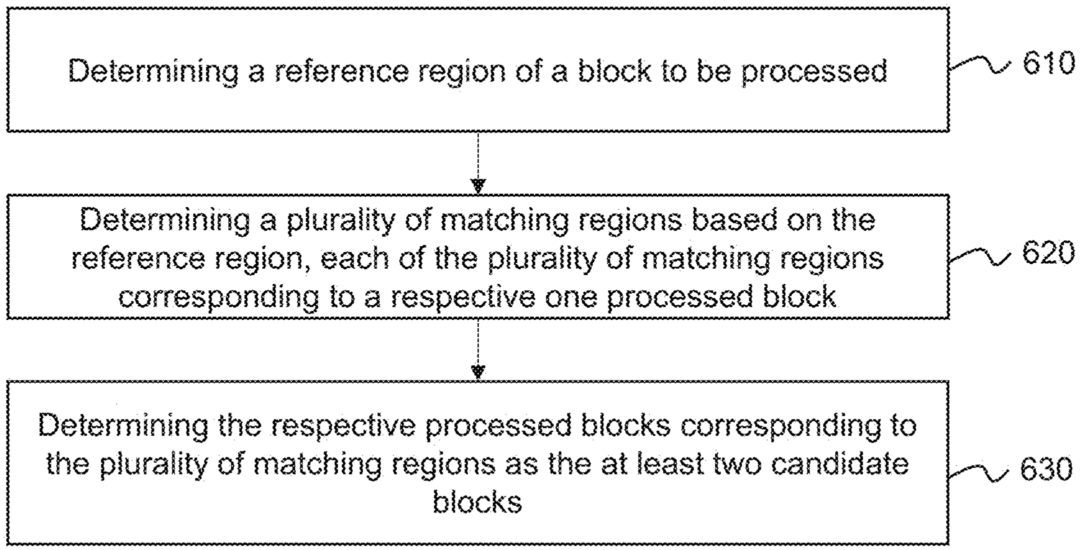
FIG. 6 is a flowchart illustrating an exemplary process for determining at least two candidate blocks according to some embodiments of the present disclosure.

FIG. 6 is a flowchart illustrating an exemplary process for determining at least two candidate blocks according to some embodiments of the present disclosure. In some embodiments, one or more operations in the process 600 may be implemented by the image processing system 100 illustrated in FIG. 1. For example, one or more operations in the process 600 may be stored in a storage device (e.g., the storage device 150, the ROM 230, the RAM 240, and/or the storage 390) as a form of instructions, and invoked and/or executed by the processing device 120 (e.g., the processor 220, the CPU 340, and/or one or more modules illustrated FIG. 4). The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 6 and described below is not intended to be limiting. In some embodiments, operation 520 in FIG. 5 may be achieved by operations of the process 600. As described in connection with operation 520, the process 600 may correspond to the first processing mode.

In some embodiments, the processing device 120 (e.g., the candidate block determination module 420) may determine a reference region of a block to be processed.

As used herein, the reference region may refer to a coded region in a vicinity of the block to be processed is located. For example, the processing device 120 may determine at least one of a left region of the block to be processed, an upper region of the block to be processed, or a left-upper region of the block to be processed as the reference region of the block to be processed. The left region of the block to be processed may include one or more coded pixels adjacent and/or close to the block to be processed on the left side of the block to be processed. The one or more coded pixels of the left region may be arranged in one or more columns. The reference region including only the left region may also be referred to as a reference region of a first type. The upper region of the block to be processed may include one or more coded pixels adjacent and/or close to the block to be processed on the upper side of the block to be processed. The one or more coded pixels of the upper region may be arranged in one or more rows. The reference region including only the upper region may also be referred to as a reference region of a second type. The left-upper region of the block to be processed may include one or more coded pixels adjacent and/or close to the block to be processed on the left side of the block to be processed and one or more coded pixels adjacent and/or close to the block to be processed on the upper side of the block to be processed. The one or more coded pixels of the left-upper region on the left side of the block to be processed may be arranged in one or more columns, and the one or more coded pixels of the left-upper region on the upper side of the block to be processed may be in arranged in one or more rows. The reference region including the left-upper region may also be referred to as a reference region of a third type.

Figure 7:
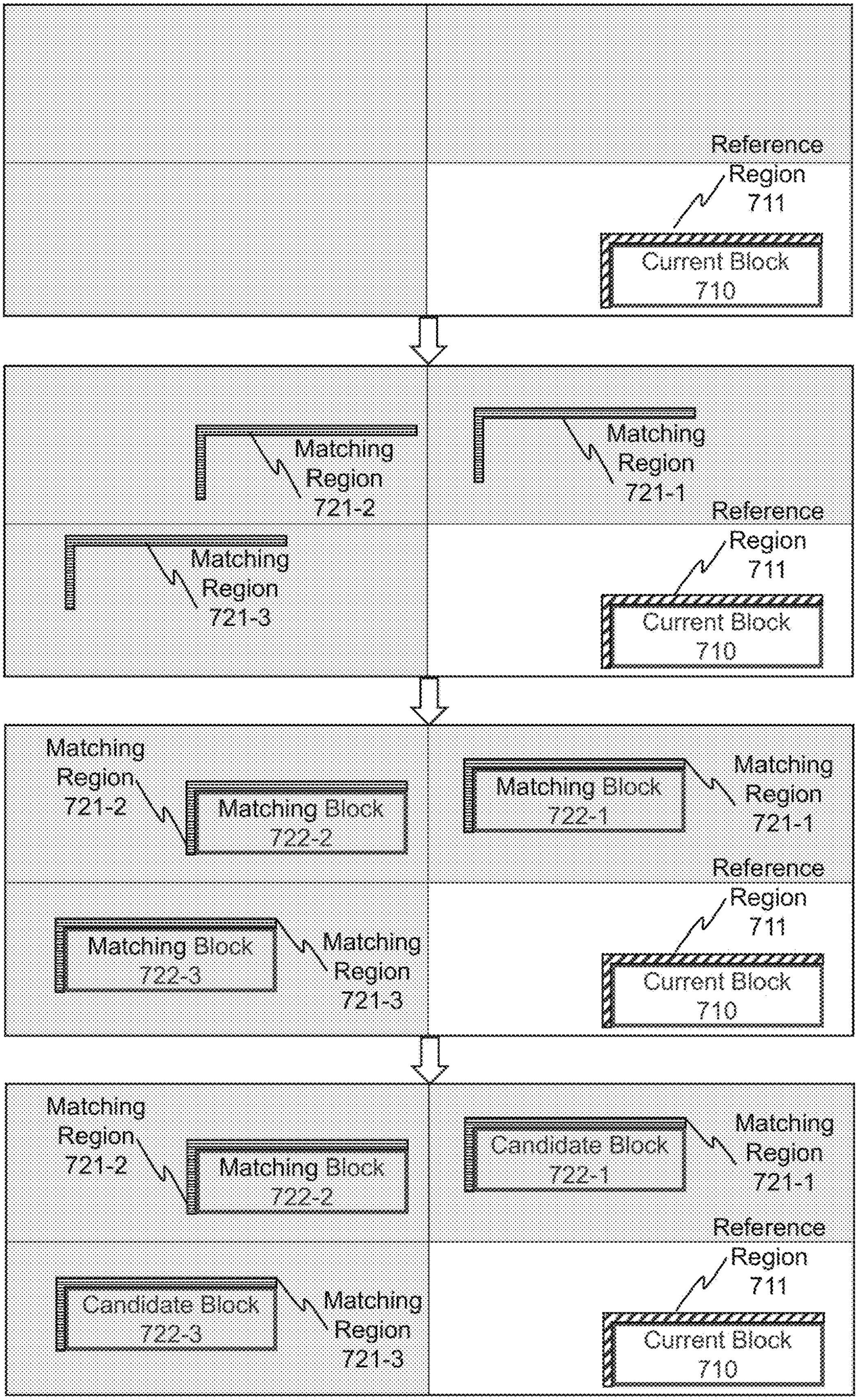
FIG. 7 is a schematic diagram illustrating an exemplary process for determining at least two candidate blocks according to some embodiments of the present disclosure.

Merely by way of example, as shown in FIG. 7, a current block 710 may the block to be processed, and a reference region 711 may be a left-upper region of the current block 710. It should be noted that the reference region 711 in FIG. 7 with an L-shape is provided for illustration purposes, the shape of the reference region 711 may be other shapes as long as the reference region 711 includes one or more coded pixels adjacent and/or close to the current block 710 on the left side of current block 710 and one or more coded pixels adjacent and/or close to the current block 710 on the upper side of the current block 710. In some embodiments, the coded pixels in the reference region may be continuous or discontinuous. For example, for the reference region including a left region of the block to be processed, the reference region may include a column of coded pixels.

In 620, the processing device 120 (e.g., the candidate block determination module 420) may determine a plurality of matching regions based on the reference region.

As used herein, a matching region may be a region having a same shape and a same size as the reference region, and a similarity between the matching region and the reference region is larger than a similarity threshold.

In some embodiments, the processing device 120 may determine the plurality of matching regions in the image based on the reference region and a preset condition. The preset condition may include that a difference (e.g., a cost value or a sum of absolute difference (SAD)) between each of the plurality of matching regions and the reference region is less than or equal to a preset difference (e.g., each of the plurality of matching regions has similar luminance and/or chrominance as the reference region), a distance between each of the plurality of matching regions and the reference region is less than or equal to a preset distance, or the like, or any combination thereof. For example, as illustrated in FIG. 7, the processing device 120 may determine matching regions 721-1, 721-2, and 721-3 based on the reference region 711 according to a searching strategy (e.g., a fast searching strategy a global searching strategy).

In some embodiments, each of the plurality of matching regions may correspond to a respective one processed block. As used herein, a relative position relationship between the matching region and its corresponding processed block may be the same as a relative position relationship between the reference region and the block to be processed. In some embodiments, a respective processed block corresponding to a matching region may also be referred to as a matching block corresponding to the matching region.

In 630, the processing device 120 (e.g., the candidate block determination module 420) may determine the respective processed blocks corresponding to the plurality of matching regions as the at least two candidate blocks.

In some embodiments, as mentioned above, a relative position relationship between the matching region and the respective matching block may be the same as a relative position relationship between the reference region and the block to be processed. Accordingly, the processing device 120 may determine the relative position relationship) between the reference region and the block to be processed, and for each of the plurality of matching regions, the processing device 120 may determine a respective processed block (i.e., a respective matching block) based on the matching region and the relative position relationship between the reference region and the block to be processed. For example, as illustrated in FIG. 7, the processing device 120 may determine respective matching blocks 722-1, 722-2, and 722-3 corresponding to the matching regions 721-1, 721-2, and 721-3 respectively based on a relative position relationship between the reference region 711 and the current block 710.

In some embodiments, the processing device 120 may designate the respective matching blocks corresponding to the plurality of matching regions as the at least two candidate blocks. In some embodiments, the processing device 120 may determine a portion of the respective matching blocks as the at least two candidate blocks. For example, the processing device 120 may rank the plurality of matching regions according to cost values of the plurality of matching regions in ascending order. Then the processing device 120 may determine a preset count of the at least two candidate blocks and designate matching blocks corresponding to the top-ranked matching regions with the preset count as the at least two candidate blocks. For example, as illustrated in FIG. 7, the processing device 120 may rank the matching regions 721-1, 721-2, and 721-3 based on corresponding cost values and designate the matching blocks 722-1 and 722-3 as the at least two candidate blocks based on the ranking result.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 8:
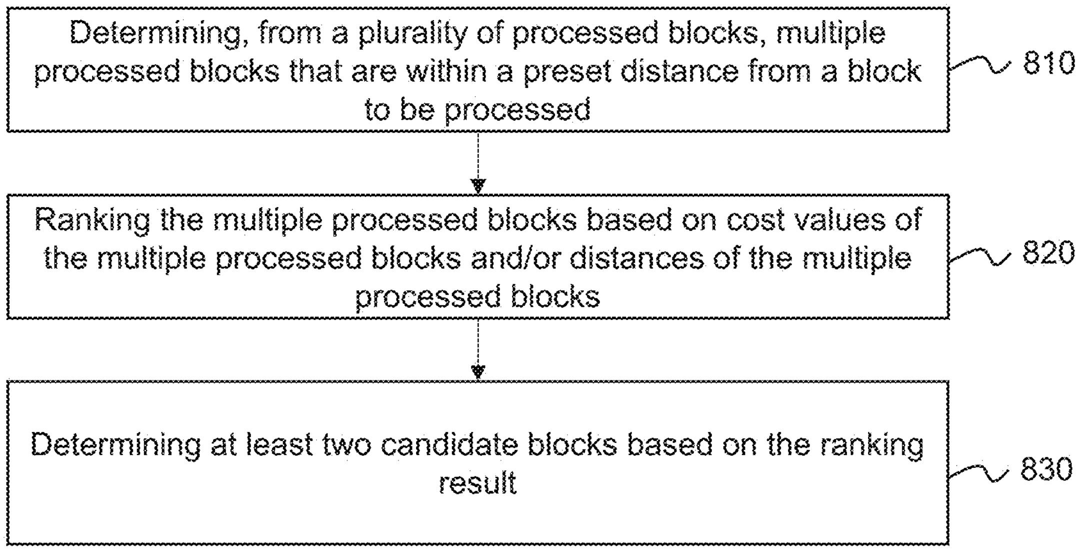
FIG. 8 is a flowchart illustrating an exemplary process for determining at least two candidate blocks according to some embodiments of the present disclosure.

FIG. 8 is a flowchart illustrating an exemplary process for determining at least two candidate blocks according to some embodiments of the present disclosure. In some embodiments, one or more operations in the process 800 may be implemented by the image processing system 100 illustrated in FIG. 1. For example, one or more operations in the process 600 may be stored in a storage device (e.g., the storage device 150, the ROM 230, the RAM 240, and/or the storage 390) as a form of instructions, and invoked and/or executed by the processing device 120 (e.g., the processor 220, the CPU 340, and/or one or more modules illustrated FIG. 4). The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 8 and described below is not intended to be limiting. In some embodiments, operation 520 in FIG. 5 may be achieved by operations of the process 800. As described in connection with operation 520, the process 800 may correspond to the second processing mode.

In 810, the processing device 120 (e.g., the candidate block determination module 420) may determine, from a plurality of processed blocks, multiple processed blocks (also referred to as multiple matching blocks) that are within a preset distance from a block to be processed.

As used herein, a distance from the block to be processed to a processed block may be represented by a count of pixels between the block to be processed and the processed block. For example, the distance from the block to be processed to the processed block may be 16384 pixels. The distance from the block to be processed to the processed block (also referred to as the distance of the processed block for brevity) may be denoted as a difference value between the block to be processed and the processed block.

In some embodiments, the processing device 120 may select, from the plurality of processed blocks, initial processed blocks having the same size as the block to be processed. Then the processing device 120 may determine the distance from the block to be processed to each of the initial processed blocks. Further, the processing device 120 may determine, from the initial processed blocks, the multiple processed blocks that are within the preset distance from the block to be processed. The preset distance may be a default setting of the image processing system 100 or adjustable according to different situations. For example, the preset distance may be 8192 pixels.

In 820, the processing device 120 (e.g., the candidate block determination module 420) may rank the multiple processed blocks based on cost values of the multiple processed blocks and/or distances of the multiple processed blocks.

In some embodiments, the processing device 120 may rank the multiple processed blocks based on the distances of the multiple processed blocks in ascending order. In some embodiments, if distances of two processed blocks are equal to each other, the two processed blocks may be ranked according to a preset rule (e.g., a processed block on the left side of the block to be processed may be ranked before a processed block on the upper side of the block to be processed).

In some embodiments, the processing device 120 may determine multiple matching regions corresponding to the multiple processed blocks respectively based on a reference region corresponding to the block to be processed. For example, as mentioned above, a relative position relationship between the reference region and the block to be processed may be the same as a relative position relationship between a matching region and its corresponding processed block. The processing device 120 may determine a cost value between the reference region corresponding to the block to be processed and each of the multiple matching regions. Then the processing device 120 may rank the multiple processed blocks according to the cost values of the multiple matching regions in ascending order.

In 830, the processing device 120 (e.g., the candidate block determination module 420) may determine at least two candidate blocks based on the ranking result.

In some embodiments, the processing device 120 may select at least two processed blocks among the multiple processed blocks based on the ranking result as the at least two candidate blocks. For example, the processing device 120 may designate at least two top-ranked processed blocks as the at least two candidate blocks.

Figure 9:
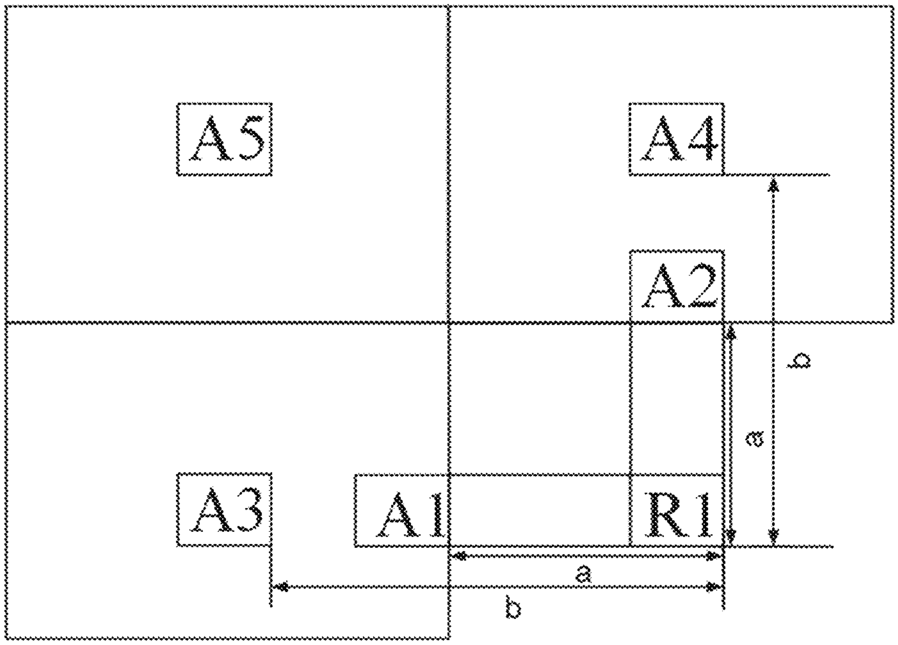
FIG. 9 is a schematic diagram illustrating an exemplary process for determining at least two candidate blocks according to some embodiments of the present disclosure.

For example, as shown in FIG. 9, a current block R1 may be a block to be processed and blocks A1, A2, A3, A4, and A5 may be the selected multiple processed blocks. It can be seen that a distance between the current block R1 to each of the blocks A1 and A2 is a, a distance between the current block R1 to each of the blocks A3 and A4 is b (b>a), and a distance between the current block R1 and the block A5 is greater than b. As the distances of the blocks A1 and A2 are the same and the distances of the blocks A3 and A4 are the same, the blocks A1, A2, A3, A4, and A5 may be ranked according to the preset rule (e.g., "the left side, the upper side, and the left and upper side") as A1, A2, A3, A4, and A5. Further, the top three blocks A1, A2, and A3 may be determined as the at least two candidate blocks based on the ranking result.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 10:
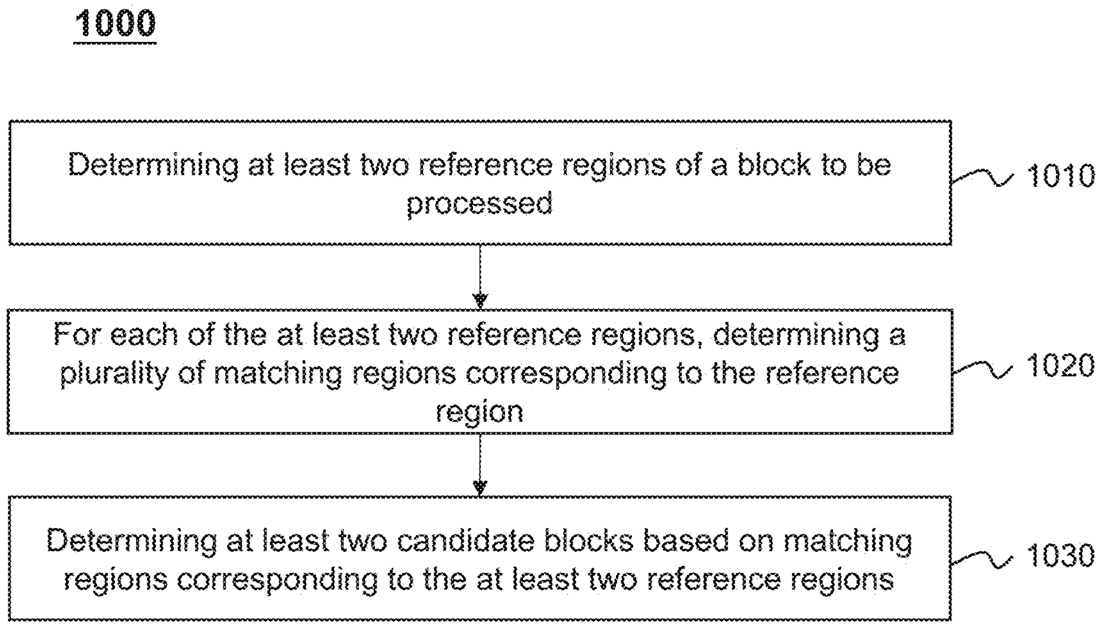
FIG. 10 is a flowchart illustrating an exemplary process for determining at least two candidate blocks according to some embodiments of the present disclosure.

FIG. 10 is a flowchart illustrating an exemplary process for determining at least two candidate blocks according to some embodiments of the present disclosure. In some embodiments, one or more operations in the process 1000 may be implemented by the image processing system 100 illustrated in FIG. 1. For example, one or more operations in the process 600 may be stored in a storage device (e.g., the storage device 150, the ROM 230, the RAM 240, and/or the storage 390) as a form of instructions, and invoked and/or executed by the processing device 120 (e.g., the processor 220, the CPU 340, and/or one or more modules illustrated FIG. 4). The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 10 and described below is not intended to be limiting. In some embodiments, operation 520 in FIG. 5 may be achieved by operations of the process 1000. As described in connection with operation 520, the process 1000 may correspond to the third processing mode.

In 1010, the processing device 120 (e.g., the candidate block determination module 420) may determine at least two reference regions of a block to be processed.

As described in connection with operation 610, the at least two reference regions may include at least two of a left region of the block to be processed, an upper region of the block to be processed, or a left-upper region of the block to be processed, that is, the at least two reference regions may include at least two regions with different types (e.g., the first type, the second type, the third type). Alternatively, the at least two reference regions may include different reference regions with the same type. For example, for at least one of the three types, the processing device 120 may determine two or more reference regions (e.g., reference regions with different sizes) of the block to be processed. Accordingly, the processing device 120 may determine at least two reference regions with the same type.

In some embodiments, sizes of the at least two reference regions, positions of the at least two reference regions, and/or a count of the at least two reference regions may be adjusted adaptively, for example, according to parameters (e.g., a size, a shape) of the block to be processed and/or encoding needs (e.g., a compression rate, a compression quality) of the block to be processed. That is, the processing device 120 may determine and/or adjust the at least two reference regions according to the parameters and/or encoding needs of the block to be processed.

For example, the reference region of the first type may include coded pixels arranged in one or more columns. A length of the reference region of the first type along the column may be equal to, greater than, or less than a left side length of the block to be processed according to actual encoding needs. As another example, the reference region of the second type may include coded pixels arranged in one or more rows. A length of the reference region of the second type along the row may be equal to, greater than, or less than an upper side length of the block to be processed according to actual encoding needs. As still another example, the reference region of the third type may include coded pixels arranged in one or more columns on the left side of the block to be processed and coded pixels arranged in one or more rows on the upper side of the block to be processed. A length (also can be referred to as a column length) of the reference region of the third type along the column may be equal to, greater than, or less than the left side length of the block to be processed, and a length (also can be referred to as a row length) of the reference region of the third type along the row may be equal to, greater than, or less than the upper side length of the block to be processed according to actual encoding needs.

Figure 11A:
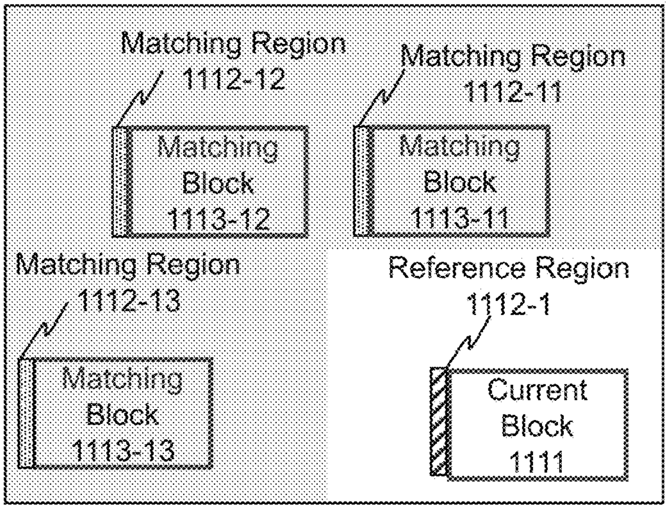
FIG. 11A is a schematic diagram illustrating an exemplary process for determining at least two candidate blocks according to some embodiments of the present disclosure.
Figure 11B:
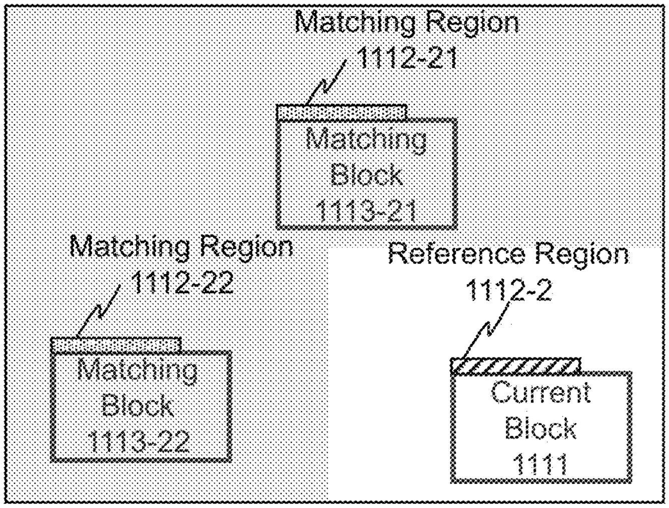
FIG. 11B is a schematic diagram illustrating another exemplary process for determining at least two candidate blocks according to some embodiments of the present disclosure.
Figure 11C:
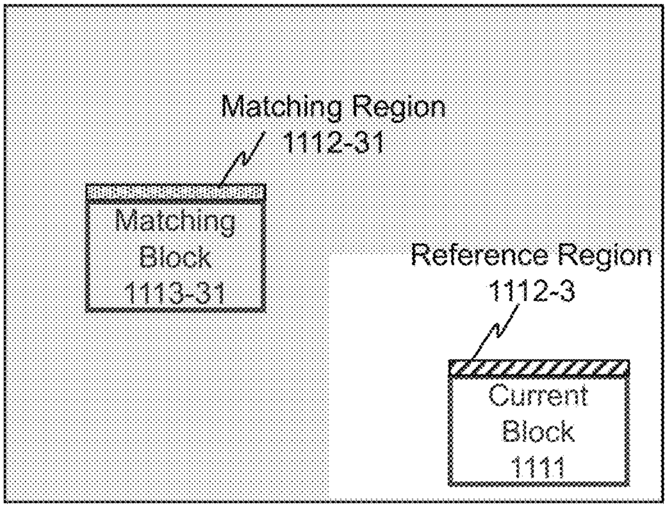
FIG. 11C is a schematic diagram illustrating another exemplary process for determining at least two candidate blocks according to some embodiments of the present disclosure.
Figure 11D:
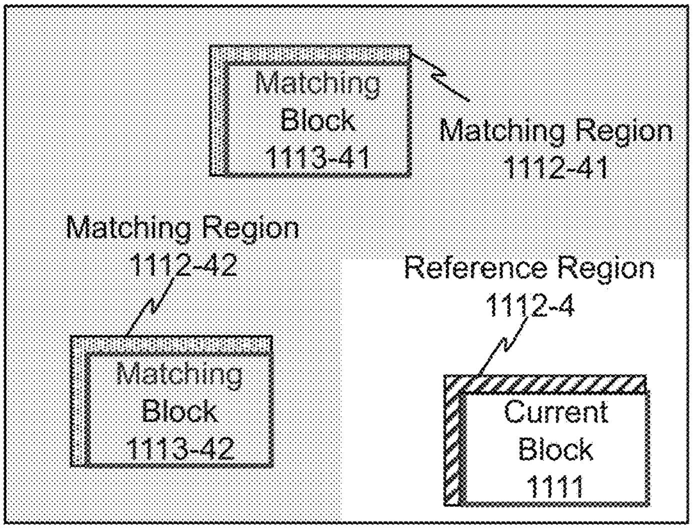
FIG. 11D is a schematic diagram illustrating another exemplary process for determining at least two candidate blocks according to some embodiments of the present disclosure.
Figure 11E:
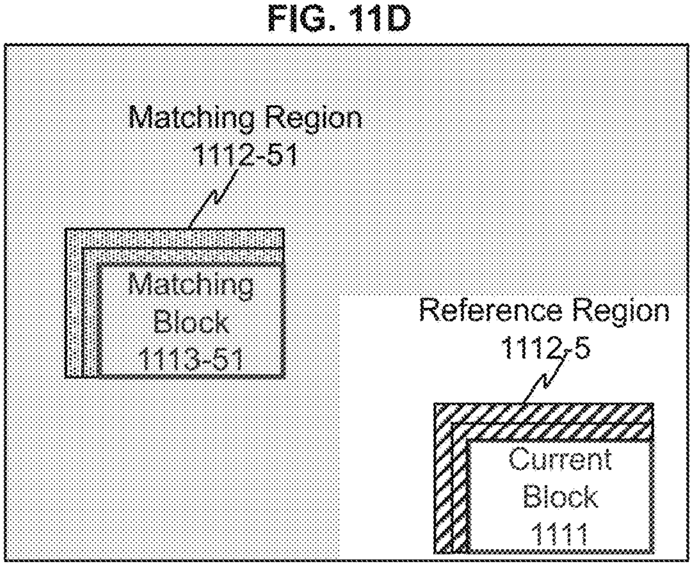
FIG. 11E is a schematic diagram illustrating another exemplary process for determining at least two candidate blocks according to some embodiments of the present disclosure.
Figure 11F:
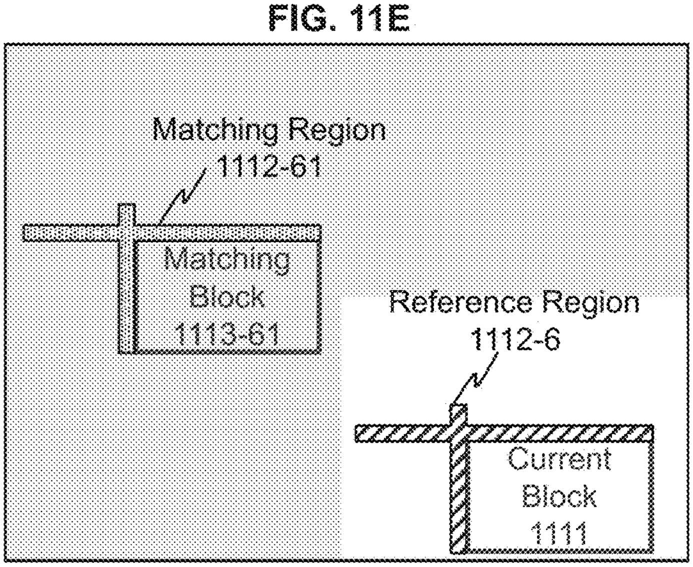
FIG. 11F is a schematic diagram illustrating another exemplary process for determining at least two candidate blocks according to some embodiments of the present disclosure.

For illustration purposes, FIGS. 11A-11F illustrate different reference regions of a current block 1111. As shown in FIG. 1A, a length of a reference region 1112-1 of the first type is equal to a left side length the current block 1111. As shown in FIG. 11B, a length of a reference region 1112-2 of the second type is less than an upper side length of the current block 1111. As shown in FIG. 11C, a length of a reference region 1112-3 of the second type is equal to the upper side length of the current block 1111. It can be seen that a count of coded pixels in the reference region 1112-2 is less than a count of the coded pixels in the reference region 1112-3. As shown in FIG. 11D, a column length and a row length of a reference region 1112-4 of the third type (e.g., an L-shaped reference region) are equal to the left side length and the upper side length of the current block 1111 respectively. As shown in FIG. 11E, a reference region 1112-5 of the third type has coded pixels arranged in two columns and two rows. Accordingly, a column length and a row length of the reference region 1112-5 are greater the left side length and the upper side length of the current block 1111 respectively. As shown in FIG. 11F, a reference region 1112-6 of the third type has a cross shape, and a column length and a row length of the reference region 1112-6 are greater the left side length and the upper side length of the current block 1111 respectively.

In 1020, for each of the at least two reference regions, the processing device 120 (e.g., the candidate block determination module 420) may determine a plurality of matching regions corresponding to the reference region. More descriptions regarding the determination of the plurality of matching regions can be found elsewhere in the present disclosure (e.g., operation 620 in FIG. 6 and the relevant description thereof).

In some embodiments, for the at least two reference regions, the corresponding counts of matching regions may be the same or different. For example, as shown in FIGS. 11A-11F, the reference region 1112-1 corresponds to three matching regions 1112-11, 1112-12, and 1112-13; the reference region 1112-2 corresponds to two matching regions 1112-21 and 1112-22; the reference region 1112-3 corresponds to a matching region 1112-31; the reference region 1112-4 corresponds to two matching regions 1112-41 and 1112-42; the reference region 1112-5 corresponds to a matching region 1112-51; and the reference region 1112-6 corresponds a matching region 1112-61. The matching regions 1112-11, 1112-12, 1112-13, 1112-21, 1112-22, 1112-31, 1112-41, 1112-42, 1112-51, and 1112-61 may correspond to matching blocks 1113-11, 1113-12, 1113-13, 1113-21, 1113-22, 1113-31, 1113-41, 1113-42, 1113-51, and 1113-61, respectively.

In 1030, the processing device 120 (e.g., the candidate block determination module 420) may determine the at least two candidate blocks based on matching regions corresponding to the at least two reference regions.

In some embodiments, the processing device 120 may rank the matching regions corresponding to the at least two reference regions based on cost values of the matching regions corresponding to the at least two reference regions. Then the processing device 120 may determine the at least two candidate blocks based on the ranking result, more descriptions of which can be found elsewhere in the present disclosure (e.g., FIGS. 12 and 13 and the descriptions thereof).

In some embodiments, for each of the at least two reference regions, the processing device 120 may determine at least one target matching region from the plurality of matching regions. Then the processing device 120 may determine the at least two candidate blocks based on the target matching regions corresponding to the at least two reference regions, more descriptions of which can be found elsewhere in the present disclosure (e.g., FIGS. 14 and 15 and relevant descriptions thereof).

In some embodiments, for each of the at least two reference regions, the processing device 120 may determine a minimum cost value among cost values of the plurality of matching regions corresponding to the reference region; and select one or more target matching regions from the plurality of machining regions corresponding to the reference region based on the minimum cost value, wherein a count of the one or more target matching regions is negatively related to the minimum cost value corresponding to the reference region. Then the processing device 120 may determine the at least two candidate blocks based on the target machining regions corresponding to the at least two reference regions, more descriptions of which can be found elsewhere in the present disclosure (e.g., FIGS. 16 and 17 and relevant descriptions thereof).

For illustration purposes, as shown in FIGS. 11A-11B, for each of the matching regions corresponding to the at least two reference regions, the processing device 121 may determine a matching block based on the matching region and the relation between the matching region and the current block 1111.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 12:
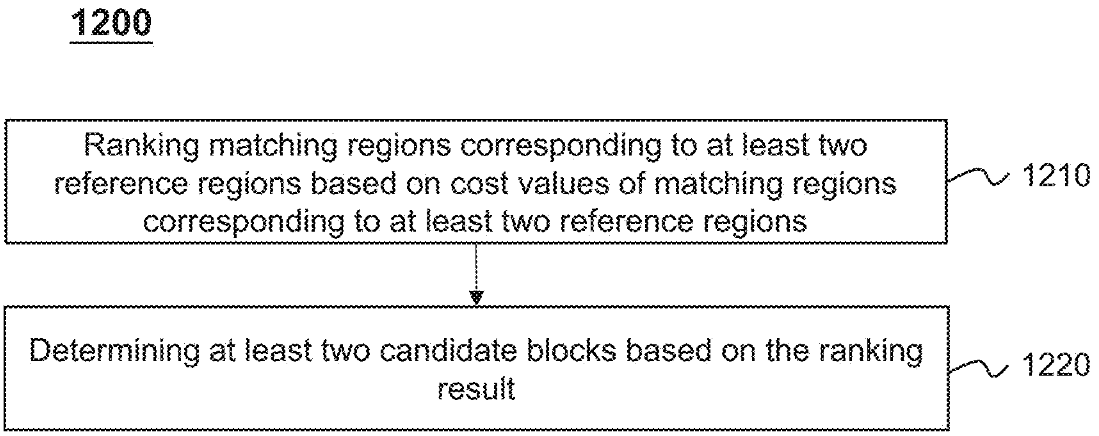
FIG. 12 is a flowchart illustrating an exemplary process for determining at least two candidate blocks according to some embodiments of the present disclosure.

FIG. 12 is a flowchart illustrating an exemplary process for determining at least two candidate blocks according to some embodiments of the present disclosure. In some embodiments, one or more operations in the process 1200 may be implemented by the image processing system 100 illustrated in FIG. 1. For example, one or more operations in the process 1200 may be stored in a storage device (e.g., the storage device 150, the ROM 230, the RAM 240, and/or the storage 390) as a form of instructions, and invoked and/or executed by the processing device 120 (e.g., the processor 220, the CPU 340, and/or one or more modules illustrated FIG. 4). The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 12 and described below is not intended to be limiting. In some embodiments, operation 1030 in FIG. 10 may be achieved by operations of the process 1200.

In 1210, the processing device 120 (e.g., the candidate block determination module 420) may rank matching regions corresponding to at least two reference regions based on cost values of the matching regions corresponding to the at least two reference regions.

Figure 13:
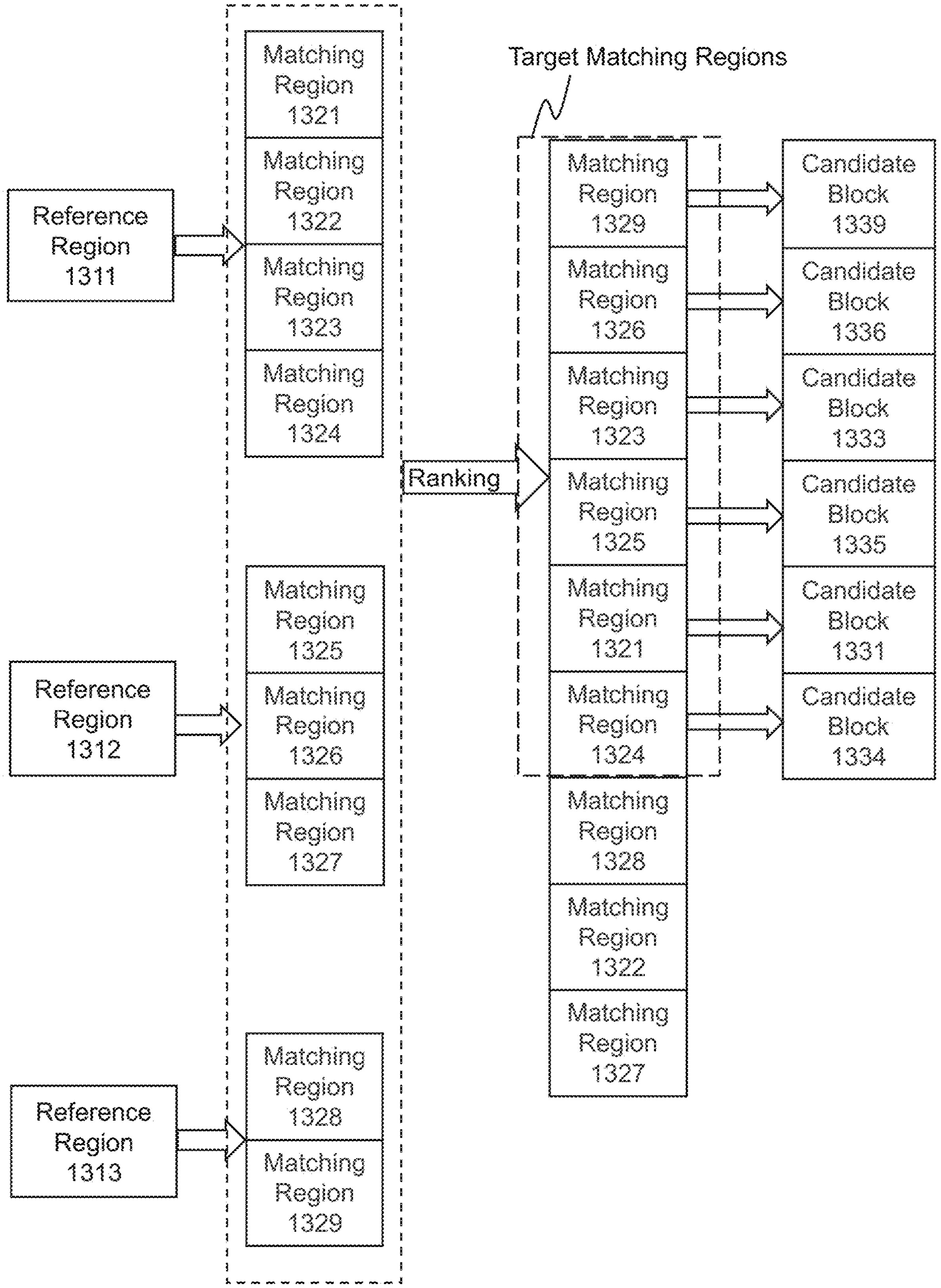
FIG. 13 is a schematic diagram illustrating an exemplary process for determining at least two candidate blocks according to some embodiments of the present disclosure.

In some embodiments, for each of the matching regions, the processing device 120 may determine a cost value of the matching region based on the matching region and a reference region corresponding to the matching region (e.g., designate a sum of absolute difference (SAD) between the matching region and the reference region as the cost value of the matching region). The processing device 120 may rank the matching regions corresponding to the at least two reference regions according to the cost values of the matching regions. For example, as shown in FIG. 13, there are three reference regions 1311, 1312, and 1313 corresponding to a current block (not shown). The reference region 1311 corresponds to four matching regions 1321, 1322, 1323, and 1324. The reference region 1312 corresponds to three matching regions 1325, 1326, and 1327. The reference region 1313 corresponds to two matching regions 1328 and 1329. The matching regions 1321-1329 are ranked according to the cost values of the matching regions in ascending order.

In 1220, the processing device 120 (e.g., the candidate block determination module 420) may determine the at least two candidate blocks based on the ranking result.

In some embodiments, the processing device 120 may determine a preset count of target matching regions from the matching regions based on the ranking result. The preset count may be an integer equal to or greater than 2. The preset count may be a default setting of the image processing system 100 or adjustable in different situations. For example, if the matching regions are ranked according to the cost values of the matching region in ascending order, the processing device 120 may determine the preset count of top-ranked matching regions as the target matching regions. Further, the processing device 120 may determine matching blocks corresponding to the target matching regions as the at least two candidate blocks of the block to be processed. For example, as shown in FIG. 13, the preset count may be 6, and the top six ranked matching regions 1329, 1326, 1323, 1325, 1321, and 1324 are determined as target matching regions. Accordingly, matching blocks 1339, 1336, 1333, 1335, 1331, and 1334 corresponding to the target matching regions are designated as the at least two candidate blocks of the current block.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 14:
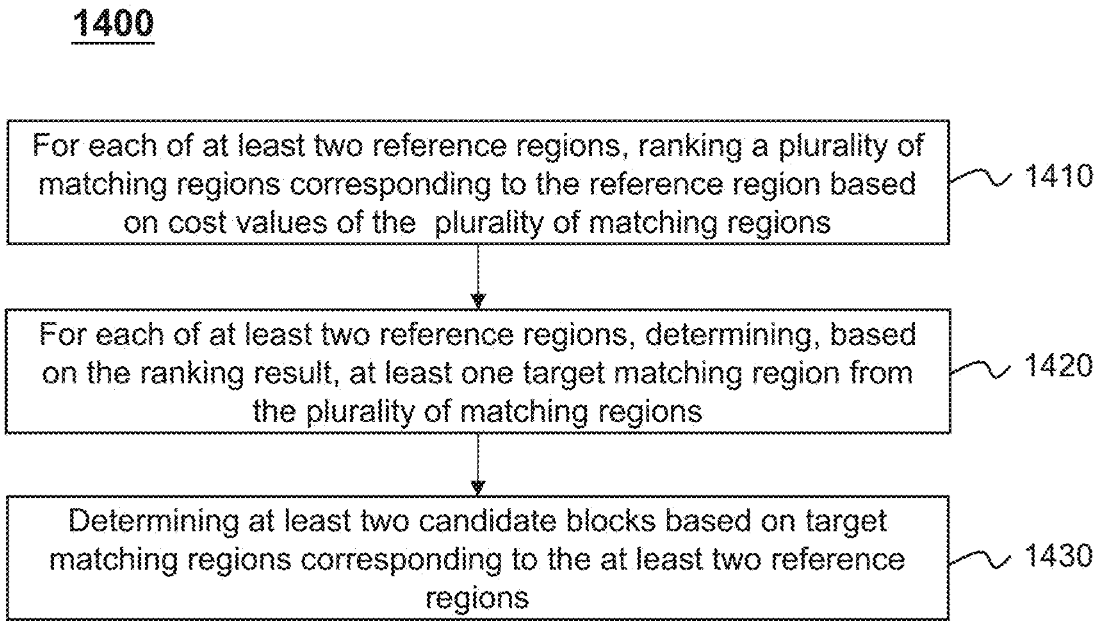
FIG. 14 is a flowchart illustrating an exemplary process for determining at least two candidate blocks according to some embodiments of the present disclosure.

FIG. 14 is a flowchart illustrating an exemplary process for determining at least two candidate blocks according to some embodiments of the present disclosure. In some embodiments, one or more operations in the process 1400 may be implemented by the image processing system 100 illustrated in FIG. 1. For example, one or more operations in the process 1400 may be stored in a storage device (e.g., the storage device 150, the ROM 230, the RAM 240, and/or the storage 390) as a form of instructions, and invoked and/or executed by the processing device 120 (e.g., the processor 220, the CPU 340, and/or one or more modules illustrated FIG. 4). The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 14 and described below is not intended to be limiting. In some embodiments, operation 1030 in FIG. 10 may be achieved by operations of the process 1400.

In 1410, for each of at least two reference regions, the processing device 120 (e.g., the candidate block determination module 420) may rank a plurality of matching regions corresponding to the reference region based on cost values of the plurality of matching regions.

Figure 15:
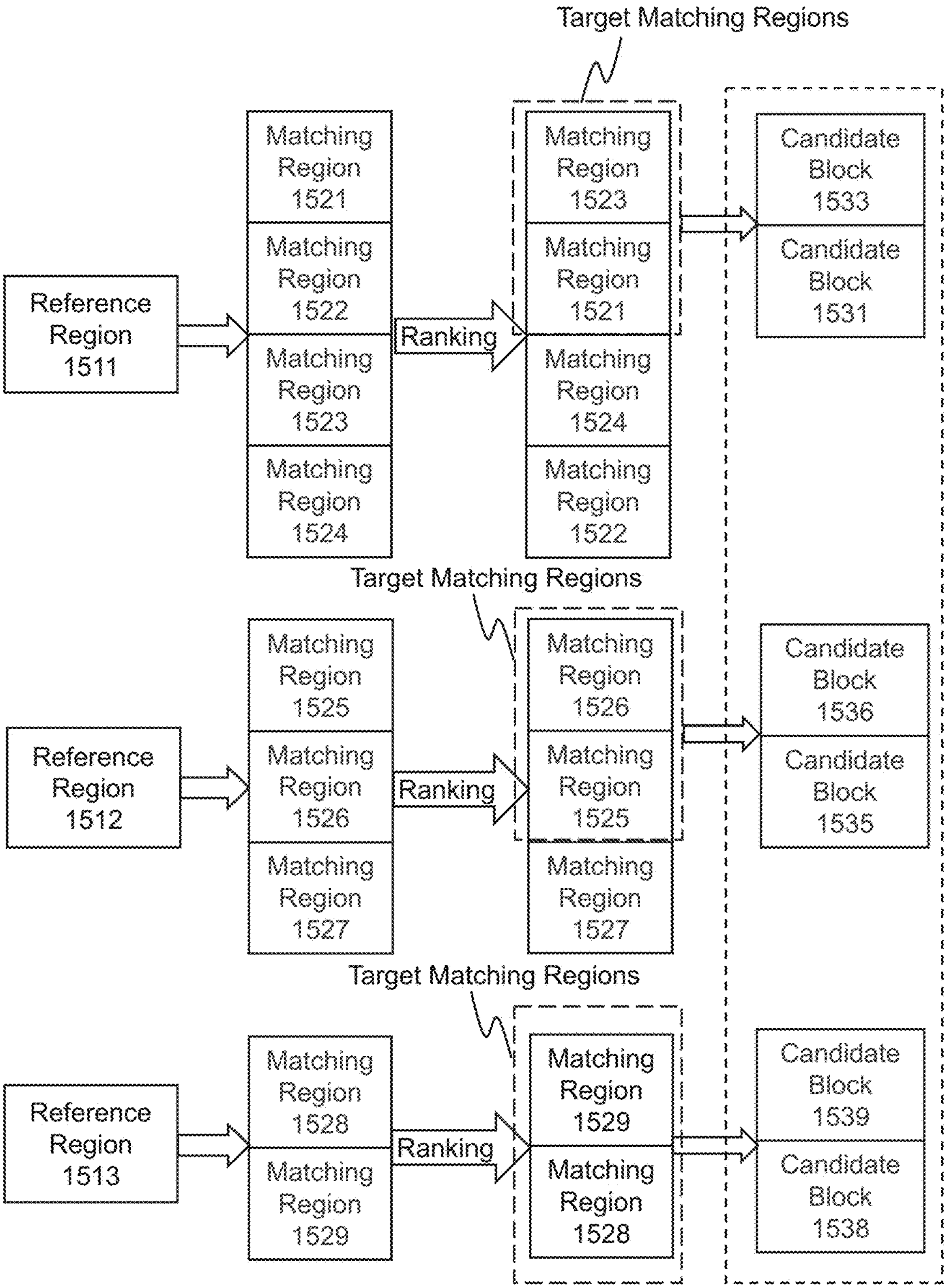
FIG. 15 is a schematic diagram illustrating an exemplary process for determining at least two candidate blocks according to some embodiments of the present disclosure.

In some embodiments, the ranking operation is similar to operation 1210 in FIG. 12. For example, as shown in FIG. 15, there are three reference regions 1511, 1512, and 1513 corresponding to a current block (not shown). The reference region 1511 corresponds to four matching regions 1521, 1522, 1523, and 1524. The matching regions 1521, 1522, 1523, and 1524 are ranked according to cost values thereof in ascending order. The reference region 1512 corresponds to three matching regions 1525, 1526, and 1527. The matching regions 1525, 1526, and 1527 are ranked according to cost values thereof in ascending order. The reference region 1513 corresponds to two matching regions 1528 and 1529. The matching region 1528 and 1529 are ranked according to cost values thereof in ascending order.

In 1420, for each of the at least two reference regions, the processing device 120 (e.g., the candidate block determination module 420) may determine, based on the ranking result, at least one target matching region from the plurality of matching regions.

In some embodiments, the target matching region(s) may be selected in a manner similar to operation 1220 in FIG. 12. In some embodiments, different reference regions may correspond to the same count of target matching regions or different counts of target matching regions. For example, as shown in FIG. 15, each of the reference regions 1511, 1512, and 1513 corresponds to two target matching regions. Two top-ranked matching regions 1523 and 1521 are determined as the target matching regions corresponding to the reference region 1511. Two top-ranked matching regions 1526 and 1527 are determined as the target matching regions corresponding to the reference region 1512. Two top-ranked matching regions 1529 and 1528 are determined as the target matching regions corresponding to the reference region 1513.

In 1430, the processing device 120 (e.g., the candidate block determination module 420) may determine the at least two candidate blocks based on target matching regions corresponding to the at least two reference regions.

In some embodiments, for each of the target matching regions, the processing device 120 may determine a matching block corresponding to the target matching region. The processing device 120 may designate matching blocks corresponding to the target matching regions as the at least two candidate blocks. For example, as shown in FIG. 15, candidate blocks 1533, 1531, 1536, 1535, 1539, and 1538 corresponding to the target matching regions are designated as the at least two candidate blocks of the current block.

In some embodiments, the processing device 120 may rank the target matching regions according to the cost values thereof in ascending order. The processing device 120 may determine matching blocks corresponding to a preset count of top-ranked target matching regions as the at least two candidate blocks. The preset count of top-ranked target matching regions may be a default setting of the image processing system 100 or adjustable according to different situations.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 16:
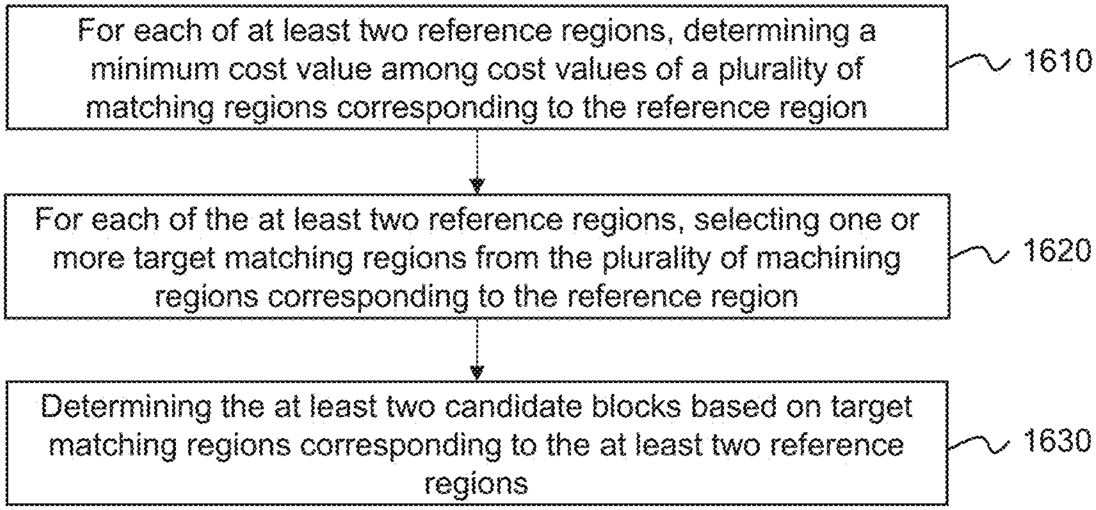
FIG. 16 is a flowchart illustrating an exemplary process for determining at least two candidate blocks according to some embodiments of the present disclosure.

FIG. 16 is a flowchart illustrating an exemplary process for determining at least two candidate blocks according to some embodiments of the present disclosure. In some embodiments, one or more operations in the process 1600 may be implemented by the image processing system 100 illustrated in FIG. 1. For example, one or more operations in the process 1600 may be stored in a storage device (e.g., the storage device 150, the ROM 230, the RAM 240, and/or the storage 390) as a form of instructions, and invoked and/or executed by the processing device 120 (e.g., the processor 220, the CPU 340, and/or one or more modules illustrated FIG. 4). The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 16 and described below is not intended to be limiting. In some embodiments, operation 1030 in FIG. 10 may be achieved by operations of the process 1600.

In 1610, for each of at least two reference regions, the processing device 120 (e.g., the candidate block determination module 420) may determine a minimum cost value among cost values of a plurality of matching regions corresponding to the reference region.

In some embodiments, for each of the at least two reference regions, the processing device 120 may rank the plurality of matching regions corresponding to the reference region according to the cost values of the plurality of matching regions in ascending order. The processing device 120 may determine a cost value of the top matching region as the minimum cost value. In some embodiments, the matching region corresponding to the minimum cost value may also be referred to as an optimal matching region corresponding to the reference region, and a matching block corresponding to the optimal region may also be referred to as an optimal candidate block corresponding to the reference region.

In 1620, for each of the at least two reference regions, the processing device 120 (e.g., the candidate block determination module 420) may select one or more target matching regions from the plurality of machining regions corresponding to the reference region.

In some embodiments, for at least two reference regions, the priority of each reference region may be determined according to the cost value of an optimal matching region corresponding to each of the at least two reference region, and the reference region with the least cost value of the optimal matching region has higher priority. In some embodiments, a first count of reference regions with highest priority may be determined as high-priority reference regions to determine the target matching region. The first count may be preset, e.g., the first count may be preset as 1, 2 or 3, etc.

In some embodiments, a count of the target matching regions selected from the matching regions corresponding to each high-priority reference region (hereinafter may be referred to as a second count) may be the same. The second count may be preset, e.g., the first count may be preset as 1, 2 or 3, etc. Exemplarily, assuming that the second count is preset as 2, for each high-priority reference region, top two ranked matching regions may be selected from theirs corresponding matching regions as the target matching regions. It may be understood that, if a count of the matching regions corresponding to a high-priority reference may be less than the second count, and all matching regions corresponding to the high-priority reference may be determined as the target reference region.

Figure 17A:
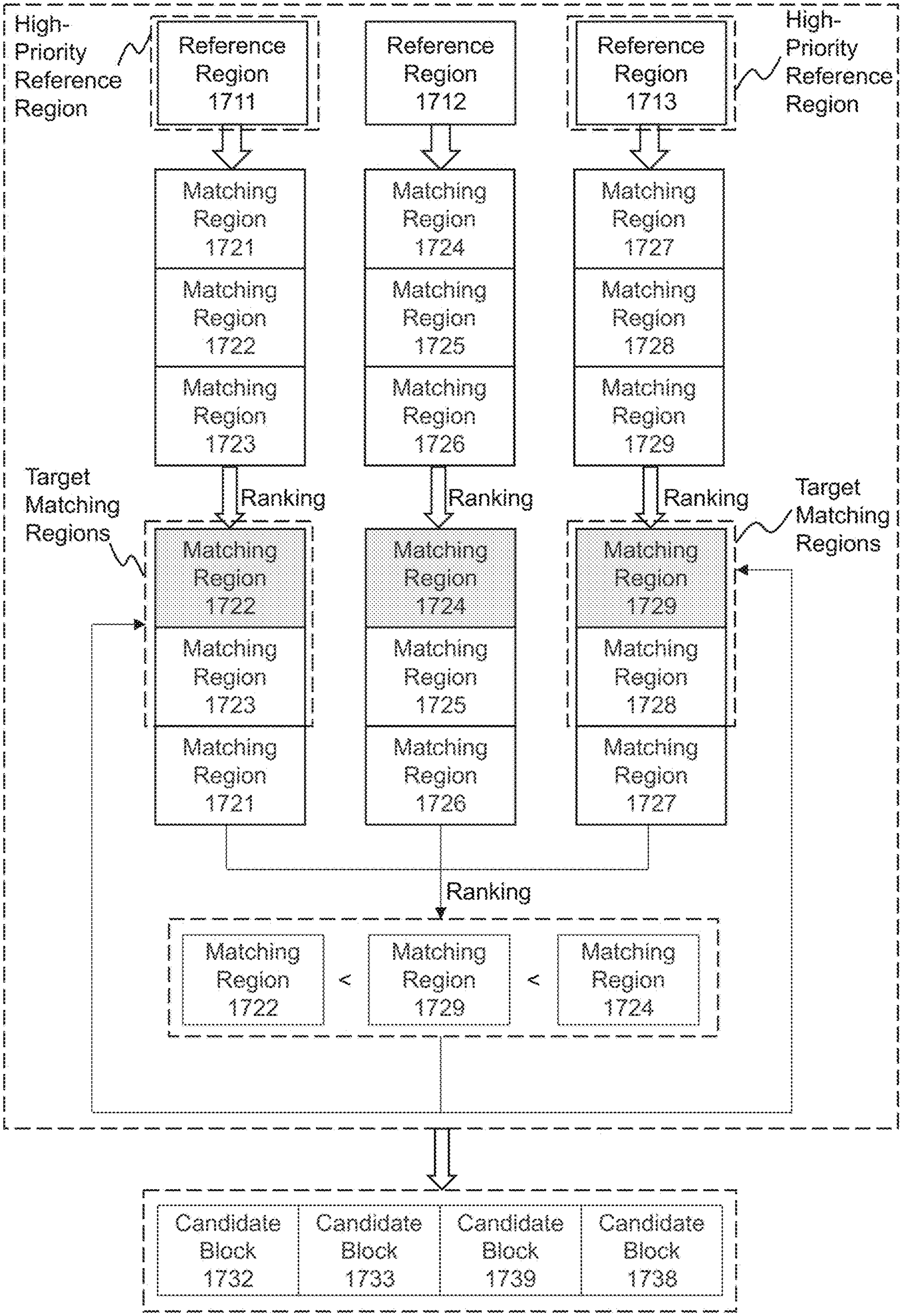
FIG. 17A is a schematic diagram illustrating an exemplary process for determining at least two candidate blocks according to some embodiments of the present disclosure.

For example, as shown in FIG. 17A, there are three reference regions 1711, 1712, and 1713 corresponding to a current block (not shown). The reference region 1711 corresponds to three matching regions 1721, 1722, and 1723. The matching regions 1721, 1722, and 1723 are ranked according to cost values thereof in ascending order and the matching region 1722 corresponds to the minimum cost value among cost values of the matching regions 1721, 1722, and 1723. The reference region 1712 corresponds to three matching regions 1724, 1725, and 1726. The matching regions 1724, 1725, and 1726 are ranked according to cost values thereof in ascending order and the matching region 1724 corresponds to the minimum cost value among cost values of the matching regions 1724, 1725, and 1726. The reference region 1713 corresponds to three matching regions 1727, 1728, and 1729. The matching regions 1727, 1728, and 1729 are ranked according to cost values thereof in ascending order and the matching region 1729 corresponds to the minimum cost value among cost values of the matching regions 1727, 1728, and 1729. The cost value of the matching region 1722 is less than the cost value of the matching region 1729, and the cost value of the matching 1729 is less than the cost value of the matching region 1724. That is, the priority of the reference region 1711 is the highest, the priority of the reference region 1713 is middle, and the priority of the reference region 1712 is the lowest. Assuming that the first count and the second count are both preset as two, the reference region 1711 and the reference region 1713 may be determined as high-priority references according to a priority order of each reference region and the first counts of the each reference region; top-ranked matching regions 1722 and 1723 may be determined as the target matching regions according to a sorting result of the matching regions corresponding to the reference region 1711 and the second count of the reference region 1711; and top-ranked matching regions 1728 and 1729 may be determined as the target matching regions according to a sorting result of the matching regions corresponding to the reference region 1713 and the second count of the reference region 1711.

In some embodiments, the count of the one or more matching regions selected form the matching regions corresponding to each high-priority reference region may be different. The count may be determined based on preset count rules. For example, if the preset count rules may be that "for the each high-priority reference region, three matching regions are selected as the target matching regions form the matching regions corresponding to the high priority reference region with the highest priority; and for the other high-priority reference regions, one matching region is respectively selected as the target matching region from the matching regions corresponding to the other high-priority reference regions.

Figure 17B:
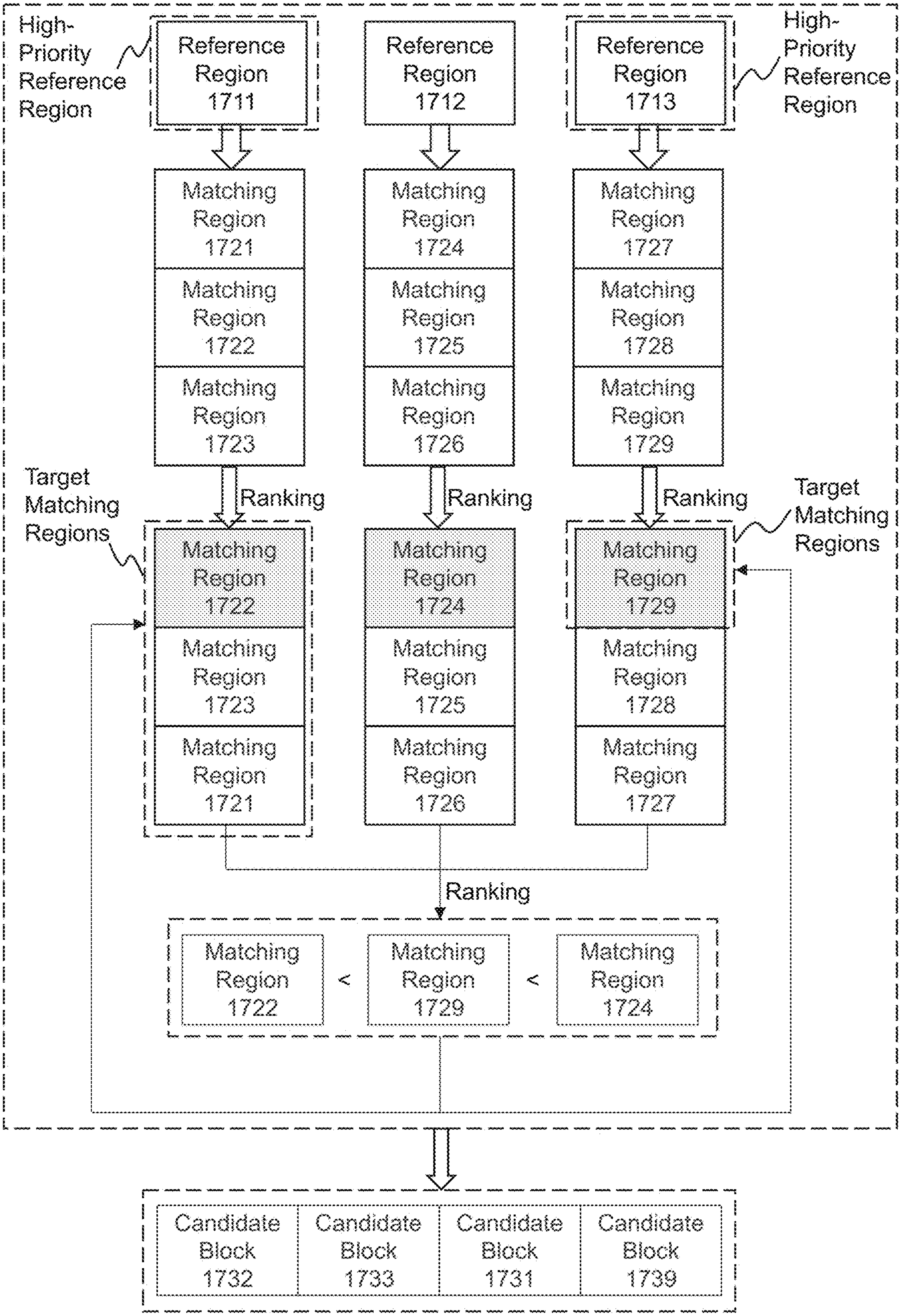
FIG. 17B is a schematic diagram illustrating another exemplary process for determining at least two candidate blocks according to some embodiments of the present disclosure.

Continuing from the previous example, assuming the preset count rules mentioned in the previous example are adopted and the first count is preset as 2, exemplarily, as shown in FIG. 17B (in FIG. 17B, a correspondence between the current block and the reference regions, a correspondence between the each reference region and the matching regions, a size relationship between the cost values of the each matching region, a size order of the optimal matching regions, and a priority relationship of the each reference region are the same as those in FIG. 17A, which may be found in FIG. 17A and the relevant descriptions thereof), the reference regions 1711 and 1713 may be determined as the high-priority references according to the priority order of each reference region and the first counts of the each reference region; according to the above preset count rules, since the priority of the reference region 1711 is the highest, three top-ranked matching regions of the matching regions corresponding to the reference region 1711 may be determined as the target matching regions; and one top-ranked matching region (i.e., the matching region 1729) of the matching regions corresponding to the reference region 1713 may be determined as the target matching region.

In some embodiments, for each of the at least two reference regions, a count of the one or more target matching regions may be negatively related to the minimum cost value corresponding to the reference region. That is, the less the minimum cost value corresponding to the reference region is, the greater the count of the one or more target matching regions selected from the plurality of matching regions corresponding to the reference region may be; and the greater the minimum cost value corresponding to the reference region is, the less the count of the one or more target matching regions selected from the plurality of matching regions corresponding to the reference region may be.

In some embodiments, the at least two reference regions may correspond to different priorities. For example, the processing device 120 may rank the at least two reference regions according to the minimum cost values thereof in ascending order. The higher a reference region is ranked, the higher the priority of the reference region may be. In some embodiments, the reference regions with different priorities may correspond to different preset counts (which may be an integer greater than or equal to 0) of target matching regions. The higher the priority of the reference is, the more the preset count of target matching regions may be. For example, for a reference region with a first priority (i.e., the minimum cost value corresponding to the reference region is minimum), the count of target matching regions may be m; for a reference region with a second priority, the preset count of target matching regions may be m−1; and so on.

Figure 17C:
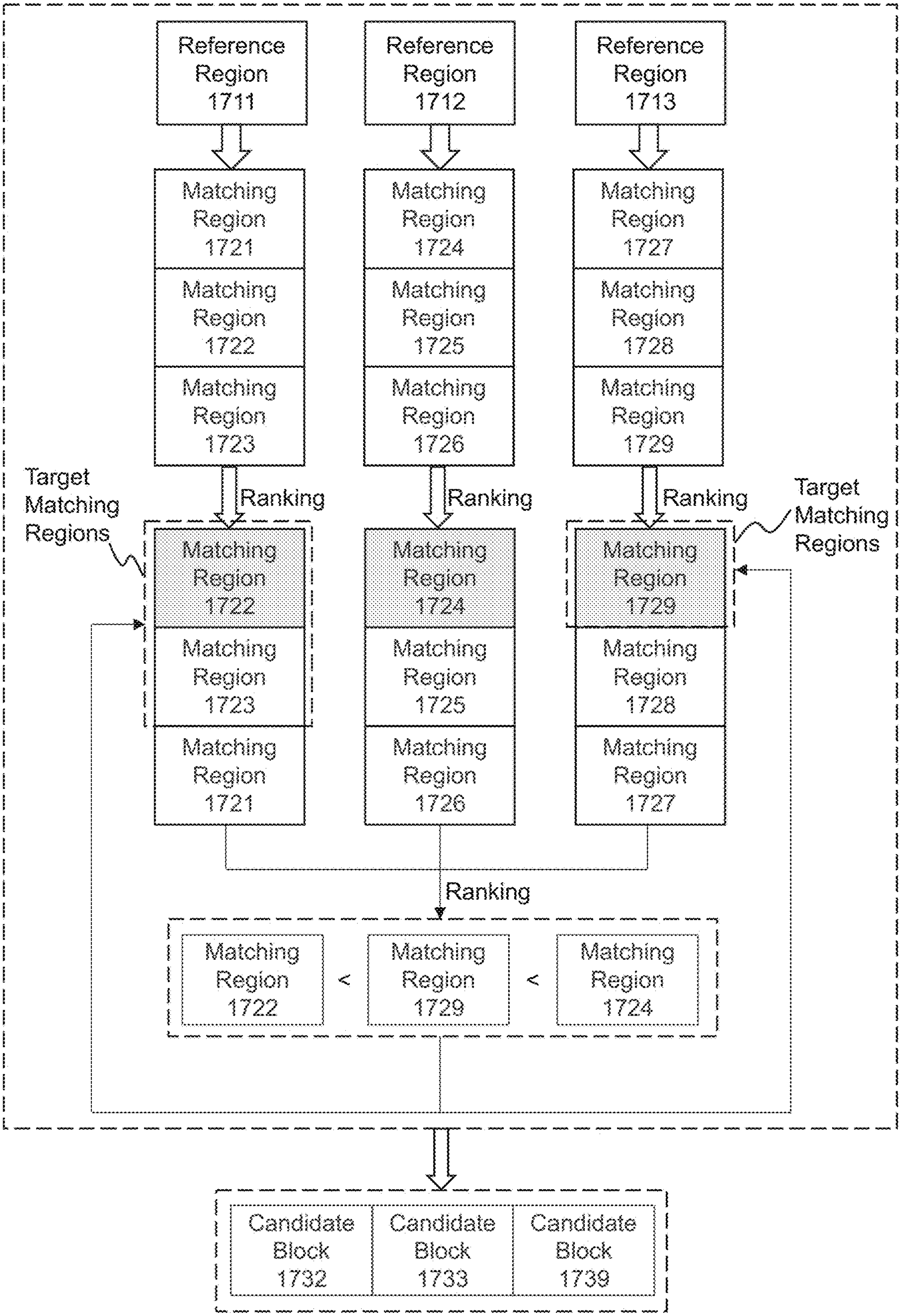
FIG. 17C is a schematic diagram illustrating another exemplary process for determining at least two candidate blocks according to some embodiments of the present disclosure.

For example, as shown in FIG. 17C (in FIG. 17C, the correspondence between the current block and the reference region, the correspondence between the each reference region and the matching regions, the size relationship between the cost values of the each matching region, the size order of the optimal matching regions, and the priority relationship of the each reference region are the same as those in FIG. 17A, which may be found in FIG. 17A and the relevant descriptions thereof), two matching regions 1722 and 1723 corresponding to the reference region 1711 and the matching region 1729 corresponding to the reference region 1713 are determined as target matching regions.

Merely by way of example, assuming that there are three reference regions (e.g., a reference region of the first type, a reference region of the second type, and a reference region of the third type), for the reference region of the first type, the processing device 120 may determine a first plurality of matching regions corresponding to the reference region of the first type. Then the processing device 120 may determine cost values {MVlt0, MVlt1, . . . , MVltn} of the first plurality of matching regions respectively. MVlt0 may be the minimum cost value among the cost values {MVlt0, MVlt1, . . . , MVltn}. For the reference region of the second type, the processing device 120 may determine a second plurality of matching regions corresponding to the reference region of the second type. Then the processing device 120 may determine cost values {MVl0, MVl1, . . . , MVln} of the second plurality of matching regions respectively. MVl0 may be the minimum cost value among the cost values {MVl0, MVl1, . . . , MVln}. For the reference region of the third type, the processing device 120 may determine a third plurality of matching regions corresponding to the reference region of the third type. Then the processing device 120 may determine cost values {MVt0, MVt1, . . . , MVtn} of the third plurality of matching regions respectively. MVt0 may be the minimum cost value of the cost values {MVt0, MVt1, . . . , MVtn}. MVl0 may be less than MVlt0, and MVlt0 may be less than MVt0, that is, MVl0<MVlt0<MVt0. Accordingly, the priorities of the three references from high to low may be the reference region of the second type, the reference region of the first type, and the reference region of the third type. Assuming that only two types of reference regions are needed, the reference region of the second type and the reference region of the first type may be selected. A count of target matching regions corresponding to the reference region of the second type may be greater than a count of target matching regions corresponding to the reference region of the first type.

In 1630, the processing device 120 (e.g., the candidate block determination module 420) may determine at least two candidate blocks based on target matching regions corresponding the at least two reference regions.

In some embodiments, the determination of the at least two candidate blocks is the same as or similar to the operation 1430 in FIG. 14.

For example, as shown in FIG. 17A, the candidate blocks 1732, 1733, 1739, and 1738 corresponding to the target matching regions 1722, 1723, 1729, and 1728 may be respectively determined as the at least two candidate blocks for the current block.

As another example, as shown in FIG. 17B, the candidate blocks 1732, 1733, 1731, and 1739 corresponding to the target matching regions 1722, 1723, 1721, and 1729 may be respectively determined as the at least two candidate blocks for the current block.

As another example, as shown in FIG. 17C, candidate blocks 1732, 1733, and 1739 corresponding to the target matching regions 1722, 1723, and 1729 respectively are designated as at least two candidate blocks of the current block.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 18:
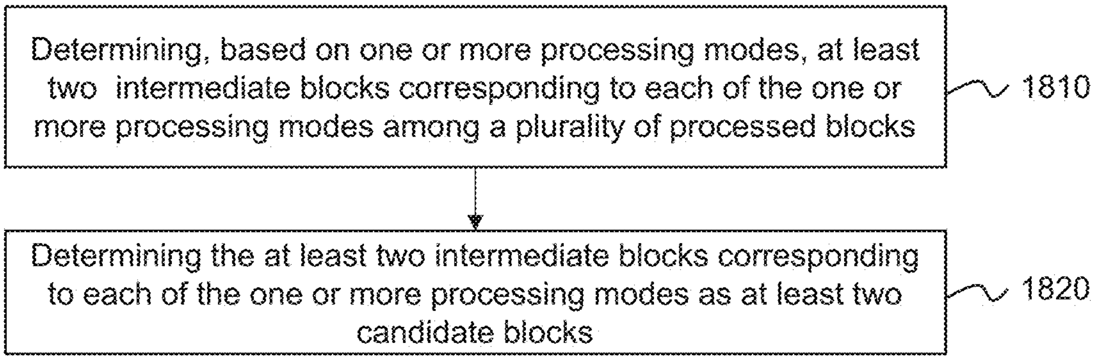
FIG. 18 is a flowchart illustrating an exemplary process for determining at least two candidate blocks according to some embodiments of the present disclosure.

FIG. 18 is a flowchart illustrating an exemplary process for determining at least two candidate blocks according to some embodiments of the present disclosure. In some embodiments, one or more operations in the process 1400 may be implemented by the image processing system 100 illustrated in FIG. 1. For example, one or more operations in the process 1800 may be stored in a storage device (e.g., the storage device 150, the ROM 230, the RAM 240, and/or the storage 390) as a form of instructions, and invoked and/or executed by the processing device 120 (e.g., the processor 220, the CPU 340, and/or one or more modules illustrated FIG. 4). The operations of the illustrated process 1800 presented below are intended to be illustrative. In some embodiments, the process may be accomplished with one or more additional operations not described, and/or without one or more of the operations discussed. Additionally, the order in which the operations of the process as illustrated in FIG. 14 and described below is not intended to be limiting. In some embodiments, operation 520 in FIG. 5 may be achieved by operations of the process 1800.

In 1810, the processing device 120 (e.g., the candidate block determination module 420) may determine, based on one or more processing modes, one or more intermediate blocks corresponding to each of the one or more processing modes among a plurality of processed blocks.

As described in connection with FIGS. 6, 8, and 10 and the descriptions thereof, the one or more processing modes may include the first processing mode, the second processing mode, the third processing mode, or the like, or any combination thereof. Merely by way of example, the one or more processing modes may include the first processing mode and the second processing mode. The processing device 120 may determine one or more first intermediate blocks corresponding to the first processing mode and one or more second intermediate blocks corresponding to the second processing mode.

In some embodiments, when only one processing mode is used, the intermediate block may be equivalent to the candidate block. The processing device 120 may determine at least two intermediate blocks (i.e., at least two candidate blocks) corresponding to the processing mode.

In 1820, the processing device 120 (e.g., the candidate block determination module 420) may determine the one or more intermediate blocks corresponding to each of the one or more processing modes as the at least two candidate blocks.

In some embodiments, the processing device 120 may designate a part or all of the intermediate block(s) corresponding to each of the one or more processing modes as the at least two candidate blocks. That is, the at least two candidate blocks may include a part or all of the intermediate blocks. For example, the processing device 120 may designate all the one or more intermediate blocks corresponding to each of the one or more processing modes as the at least two candidate blocks. As another example, the processing device 120 may rank all the one or more intermediate blocks corresponding to each of the one or more processing modes according to cost values thereof in ascending order. The processing device 120 may designate a preset count of top-ranked intermediate blocks as the at least two candidate blocks. The preset count may be a default setting of the image processing system 100 or adjustable according to different situations.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 19:
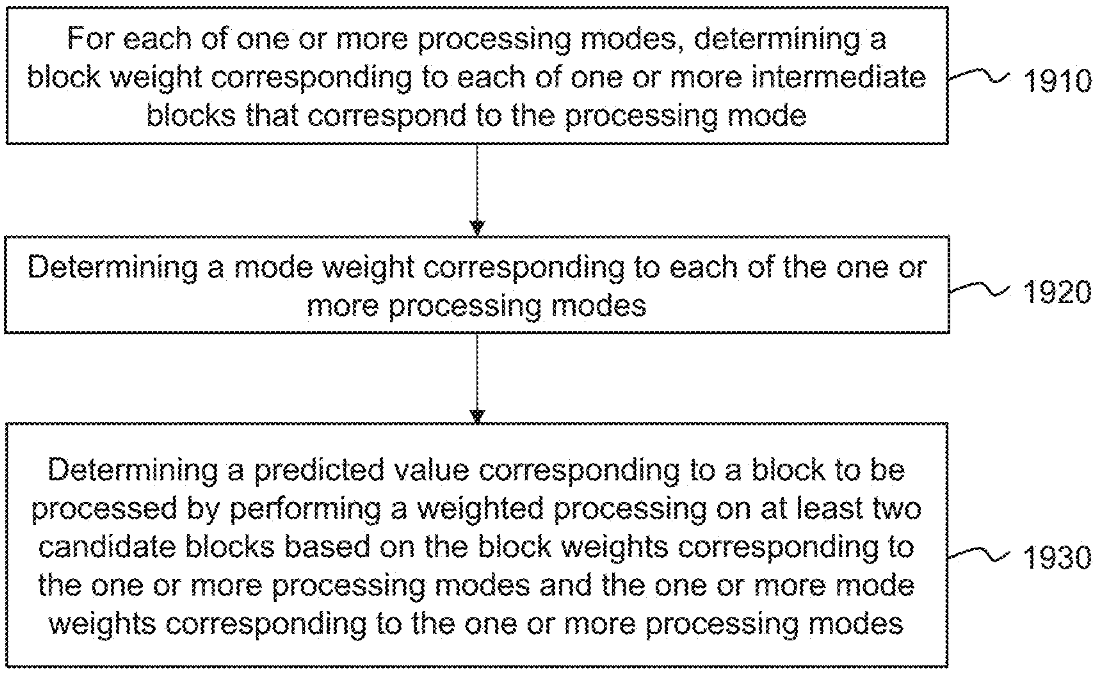
FIG. 19 is a flowchart illustrating an exemplary process for determining a predicted value corresponding to a block to be processed according to some embodiments of the present disclosure.

FIG. 19 is a flowchart illustrating an exemplary process for determining a predicted value corresponding to a block to be processed according to some embodiments of the present disclosure. In some embodiments, one or more operations in the process 1900 may be implemented by the image processing system 100 illustrated in FIG. 1. For example, one or more operations in the process 1900 may be stored in a storage device (e.g., the storage device 150, the ROM 230, the RAM 240, and/or the storage 390) as a form of instructions, and invoked and/or executed by the processing device 120 (e.g., the processor 220, the CPU 340, and/or one or more modules illustrated FIG. 4). The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 19 and described below is not intended to be limiting. In some embodiments, operation 530 in FIG. 5 may be achieved by operations of the process 1900.

In 1910, for each of one or more processing modes, the processing device 120 (e.g., the predicted value determination module 430) may determine a block weight corresponding to each of one or more intermediate blocks that correspond to the processing mode.

In some embodiments, for a processing mode, the processing device 120 may determine the block weight corresponding to each of one or more intermediate blocks that correspond to the processing mode based on a difference value (e.g., a cost value, a distance) between the intermediate block and the block to be processed. For example, a block weight corresponding to an intermediate block may be negatively related to a difference value between the intermediate block and the block to be processed. That is, the greater the difference value between the intermediate block and the block to be processed is, the less the block weight corresponding to the intermediate block may be.

In 1920, the processing device 120 (e.g., the predicted value determination module 430) may determine a mode weight corresponding to each of the one or more processing modes.

In some embodiments, the processing device 120 may determine a mode weight corresponding to a processing mode based on block weights corresponding to the one or more intermediate blocks that correspond to the processing mode. For example, the processing device 120 may determine the mode weight corresponding to the processing mode by weighting the block weights corresponding to the one or more intermediate blocks that correspond to the processing mode.

In some embodiments, the mode weight corresponding to a processing mode may be a default setting of the image processing system 100. For example, the mode weight corresponding to the first processing mode may be 0.5, the mode weight corresponding to the second processing mode may be 0.3, and the mode weight corresponding to the third processing mode may be 0.2. As another example, the mode weight corresponding to the first processing mode may be 0.8, the mode weight corresponding to the second processing mode may be 0.2, and the mode weight corresponding to the third processing mode may be 0.

In some embodiments, the mode weight corresponding to a processing mode may be adjustable under different situations, for example, according to actual coding needs, according to application scenarios, etc.

In 1930, the processing device 120 (e.g., the predicted value determination module 430) may determine a predicted value corresponding to the block to be processed by performing a weighting processing on at least two candidate blocks based on the block weights corresponding to the one or more processing modes and the one or more mode weights corresponding to the one or more processing modes.

For example, the one or more processing modes may include the first processing mode, the second processing mode, and the third processing mode. The at least two candidate blocks may include two intermediate blocks P0 and P1 corresponding to the first processing mode, two intermediate blocks P2 and P3, and two intermediate blocks P4 and P5. Block weights corresponding to the first processing mode may be 0.6 corresponding to P0 and 0.4 corresponding to P1. Block weights corresponding to the second processing mode may be 0.7 corresponding to P2 and 0.3 corresponding to P3. Block weights corresponding to the third processing mode may be 0.9 corresponding to P4 and 0.1 corresponding to P5. The mode weights corresponding to the first processing mode, the second processing mode, and the third processing mode may be 0.5, 0.3, and 0.2, respectively. Accordingly, the predicted value (denoted by P) corresponding to the block to be processing may be determined as follows: P=(P0*0.6+P1*0.4)*0.5+(P2*0.7+P3*0.3)*0.3+(P4*0.9+P5*0.1)*0.2.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 20:
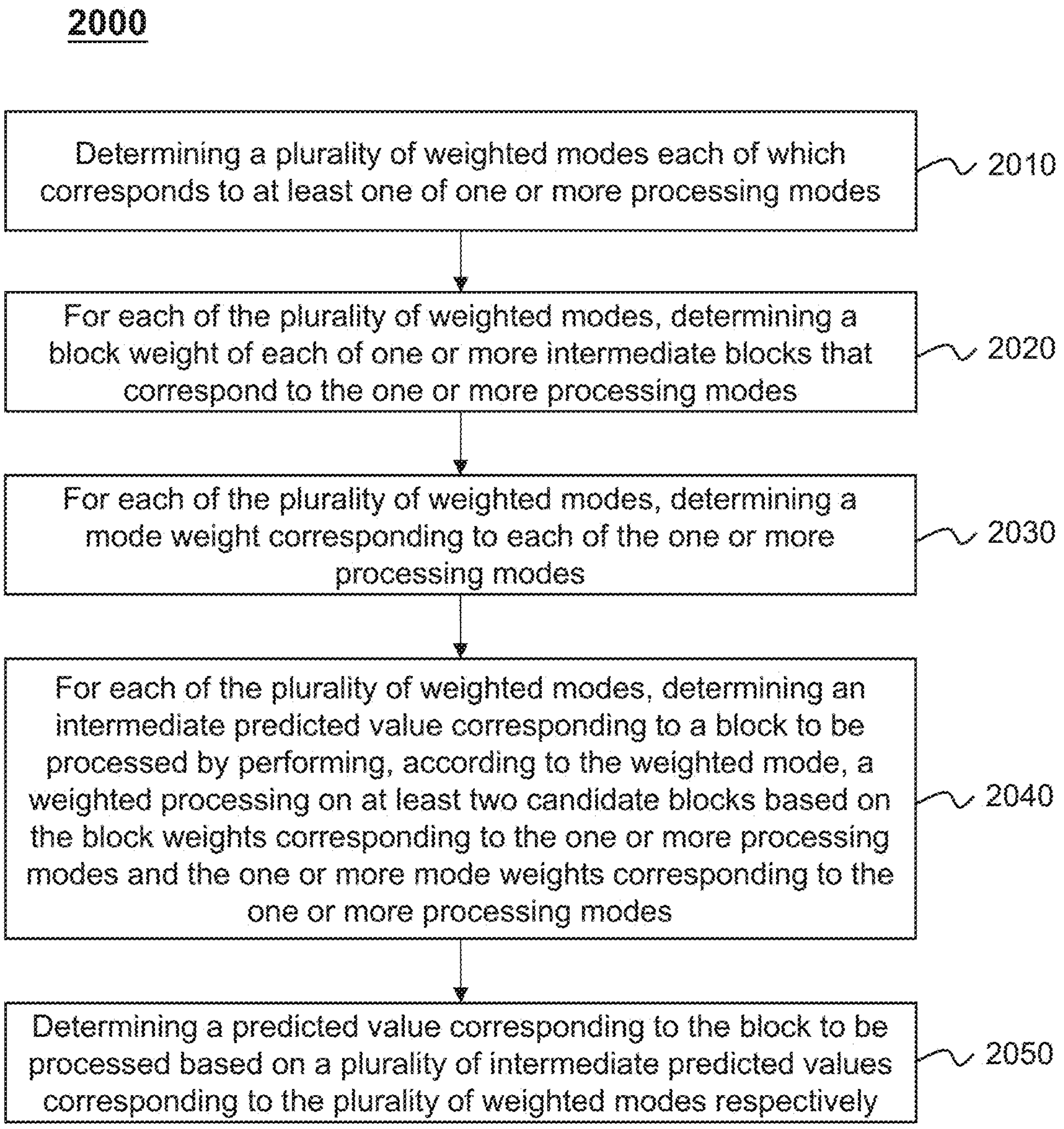
FIG. 20 is a flowchart illustrating an exemplary process for determining a predicted value corresponding to a block to be processed according to some embodiments of the present disclosure.

FIG. 20 is a flowchart illustrating an exemplary process for determining a predicted value corresponding to a block to be processed according to some embodiments of the present disclosure. In some embodiments, one or more operations in the process 2000 may be implemented by the image processing system 100 illustrated in FIG. 1. For example, one or more operations in the process 2000 may be stored in a storage device (e.g., the storage device 150, the ROM 230, the RAM 240, and/or the storage 390) as a form of instructions, and invoked and/or executed by the processing device 120 (e.g., the processor 220, the CPU 340, and/or one or more modules illustrated FIG. 4). The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 20 and described below is not intended to be limiting. In some embodiments, operation 530 in FIG. 5 may be achieved by operations of the process 2000.

In 2010, the processing device 120 (e.g., the predicted value determination module 430) may determine a plurality of weighting modes each of which corresponds to at least one of one or more processing modes. As used herein, a weighting mode may refer to a combination mode of one or more processing modes. If there is only one processing mode, the weighing mode can be considered as the processing mode itself.

Merely by way of example, the plurality weighting modes may include a first weighting mode, a second weighting mode, etc. The first weighting mode may be a combination of two processing modes (e.g., the first processing mode and the second processing mode, the first processing mode and the third processing mode, or the second processing mode and the third processing mode). The second weighting mode may be a combination of three processing modes (e.g., the first processing mode, the second processing mode, and the third processing mode).

In 2020, for each of the plurality of weighting modes, the processing device 120 (e.g., the predicted value determination module 430) may determine a block weight of each of one or more intermediate blocks that correspond to the one or more processing modes.

In some embodiments, the determination of the block weights is the same as or similar to operation 1910 in FIG. 19.

In 2030, for each of the plurality of weighting modes, the processing device 120 (e.g., the predicted value determination module 430) may determine a mode weight corresponding to each of the one or more processing modes.

In some embodiments, the determination of the mode weights is the same as or similar to operation 1920 in FIG. 19.

In 2040, for each of the plurality of weighting modes, the processing device 120 (e.g., the predicted value determination module 430) may determine an intermediate predicted value corresponding to a block to be processed by performing, according to the weighting mode, a weighting processing on at least two candidate blocks based on the block weights corresponding to the one or more processing modes and the one or more mode weights corresponding to the one or more processing modes.

In some embodiments, for each of the plurality of weighting modes, the processing device 120 may determine an intermediate predicted value corresponding to the block to be processed by performing a weighting processing on at least two candidate blocks corresponding to the two or more processing modes based on the block weights corresponding to two or more processing modes and the mode weights corresponding to the two or more processing modes, which is the same as or similar to the determination of the predicted value in operation 1930 in FIG. 19.

In 2050, the processing device 120 (e.g., the predicted value determination module 430) may determine a predicted value corresponding to the block to be processed based on a plurality of intermediate predicted values corresponding to the plurality of weighting modes respectively.

In some embodiments, for each of the plurality of weighting modes, the processing device 120 may determine a difference value (e.g., a cost value) between the bock to be processed and the intermediate predicted value corresponding to the weighting mode. The processing device 120 may determine a minimum difference value among the difference values corresponding to the plurality of weighting modes. Then processing device 120 may determine the weighting mode corresponding to the minimum difference value as an optimal weighting mode and designate the intermediate predicted value corresponding to the optimal weighting mode as the predicted value corresponding to the block to be processed for encoding the block to be processed.

According to some embodiments of the present disclosure, by using the one or more weighting modes, the determined predicted value corresponding to the block to be processed may be closer to the true value of the block to be processed, thereby improving the image quality during encoding and decoding.

In some embodiments, the processing device 120 may determine residual information between the block to be processed and the predicted value corresponding to the block to be processed. The processing device 120 may encode the block to be processed into an encoded bitstream by encoding the residual information. A receiving end may decode the block to be processed in the encoded bitstream by encoding the residual information.

In some embodiments, as described above, since different processing modes and/or different weighting modes may be used, identification information (e.g., identifier) may be set for distinguishing the different processing modes and/or different weighting modes.

In some embodiments, a first identifier may be set for indicating that weighting modes are used. As described in connection with FIG. 20, if the weighting modes are not compared or ranked to determine the optimal weighting mode, each of the weighting modes may correspond to the same weight. For example, there may be two weighting modes, and a weight of each of the two weighting modes may be 50%. As another example, there may be four weighting modes, and a weight of each of the four weighting modes may be 25%.

Further, also as described in connection with FIG. 20, if the weighting modes are compared or ranked to determine the optimal weighting mode, a second identifier may be set for distinguishing the type of the optimal weighting mode that is finally used for encoding. For example, when the second identifier is 1, the second identifier may indicate that the optimal weighting mode corresponds to a combination of the first processing mode with a weight of 75% and the second processing mode with a weight of 25%. When the second identifier is 2, the second identifier may indicate that the optimal weighting mode corresponds a combination of the first processing mode with a weight of 80% and the second processing mode with a weight of 20%. When the second identifier is 3, the second identifier may indicate that the optimal weighting mode corresponds to a combination of the first processing mode with a weight of 30%, the second processing mode with a weight of 30%, and the third processing mode with a weight of 40%.

In some embodiments, the processing device 120 may encode the block to be processed based on the predicted value corresponding to the block to be processed and the identification information to obtain an encoded bitstream. For example, when a specific weighting mode is determined for prediction, the processing device 120 may encode the predicted value determined using the specific weighting mode and the identification information of the specific weighting mode to the encoded bitstream of the block to be processed, such that the receiving end can distinguish that the current block is encoded based on the specific weighting mode.

In some embodiments, during the encoding process, a block-level syntax identifier may be set. For example, the syntax identifier of intraTMP_weight_mode may be used. The intraTMP_weight_mode of 0 may indicate that an existing intraTMP is used (e.g., the current block is predicted using coded pixels on the left side and the upper side of the current block to obtain a single candidate block), and intraTMP_weight_mode of 1 may indicate that a weighing mode in the present disclosure is used. As another example, for the weighting modes in the present disclosure, the syntax identifier of intraTMP_weigh_sub may be used. Merely by way of example, the intraTMP_weigh_sub of 0 (i.e., intraTMP_weigh_sub=0) may represent the first processing mode. The intraTMP_weigh_sub of 1 (i.e., intraTMP_weigh_sub=1) may represent the second processing mode.

In some embodiments, during the decoding process, the receiving end may obtain the encoded bitstream that is determined as described above. The receiving end may determine at least two candidate blocks corresponding to the current block based on the encoded bitstream. For example, the processing device 120 may determine the specific weighting mode that is used to predict the current block. The receiving end may use the specific weighting mode to determine the at least two candidate blocks corresponding to the current block, operations of which may be similar to the encoding process as described elsewhere in the present disclosure. The receiving end may allocate block weights for the at least two candidate blocks according to a difference value between each of the at least two candidate blocks and the current block, which is similar to the determination of the block weights during the encoding process. The receiving end may determine the predicted value corresponding to the current block based on the block weights of the at least two candidate blocks, which is similar to the determination of the predicted value during the encoding process. Further, the receiving end may obtain the current block based on the encoded bitstream and the predicted value corresponding to the current block. For example, the receiving end may obtain the current block based on the predicted value and residual information in the encoded bitstream.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

In some embodiments, after the predicted value corresponding to the current block is determined, the processing device 120 may adaptively adjust reference region(s) of a next block to be processed according to feedback of the predicted value corresponding to the current block. For example, the processing device 120 may adjust the sizes and/or counts of the reference region(s) of the next block to be processed based on a difference between a cost value corresponding to the predicted value of the current block and a cost value threshold according to preset adjustment rule. In some embodiments, after the predicted value corresponding to the current block is determined, the processing device 120 may determine a similarity between the next block to be processed and the current block (and/or one or more encoded blocks before the next block). In response to determining that the similarity is less than or equal to a preset threshold, the processing device 120 may use the optimal weighting mode corresponding to the current block (or the one or more encoded blocks before the next block) to determine a predicted value corresponding to the next block to be processed. In response to determining that the similarity is greater than the preset threshold, the processing device 120 may determine the optimal weighting mode corresponding to the next block to be processed according to operations in FIG. 20. In such cases, the computing amount during intra prediction can be reduced.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure, and are within the spirit and scope of the exemplary embodiments of the present disclosure.

Moreover, certain terminology has been used to describe embodiments of the present disclosure. For example, the terms "one embodiment", "an embodiment" and/or "some embodiments" mean that a particular feature, structure or characteristic described in connection with the embodiment is included in at least one embodiment of the present disclosure. Therefore, it is emphasized and should be appreciated that two or more references to "an embodiment", "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block", "module", "engine", "unit", "component" or "system". Furthermore, aspects of the present disclosure may take the form of a computer program product embodied in one or more computer-readable media having computer-readable program code embodied thereon.

A computer-readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB.NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for image processing, comprising:

at least one storage device including a set of instructions; and at least one processor in communication with the at least one storage device, wherein when executing the set of instructions, the at least one processor is directed to cause the system to perform operations including:

obtaining an image including a plurality of processed blocks and at least one block to be processed;

for a block to be processed among the at least one block to be processed, determining at least two candidate blocks among the plurality of processed blocks, including:

determining, based on one or more processing modes, one or more intermediate blocks corresponding to each of the one or more processing modes among the plurality of processed blocks; and determining the one or more intermediate blocks corresponding to each of the one or more processing modes as the at least two candidate blocks; and determining a predicted value corresponding to the block to be processed based on the at least two candidate blocks, including:

for each of the one or more processing modes, determining a block weight corresponding to each of the one or more intermediate blocks that correspond to the processing mode; and determining a mode weight corresponding to the processing mode; and determining the predicted value corresponding to the block to be processed by performing a weighting processing on the at least two candidate blocks based on the block weights corresponding to the one or more processing modes and the one or more mode weights corresponding to the one or more processing modes.

2. The system of claim 1, wherein the determining at least two candidate blocks among the plurality of processed blocks includes:

determining a reference region of the block to be processed;

determining a plurality of matching regions based on the reference region, each of the plurality of matching regions corresponding to a respective one processed block; and determining the respective processed blocks corresponding to the plurality of matching regions as the at least two candidate blocks.

3. The system of claim 1, wherein the determining at least two candidate blocks among the plurality of processed blocks includes:

determining, from the plurality of processed blocks, multiple processed blocks that are within a preset distance from the block to be processed;

ranking the multiple processed blocks based on cost values of the multiple processed blocks and/or distances of the multiple processed blocks; and determining the at least two candidate blocks based on the ranking result.

4. The system of claim 1, wherein the determining at least two candidate blocks among the plurality of processed blocks includes:

determining at least two reference regions of the block to be processed;

for each of the at least two reference regions, determining a plurality of matching regions corresponding to the reference region, each of the plurality of matching regions corresponding to a respective one processed block; and determining the at least two candidate blocks based on matching regions corresponding to the at least two reference regions.

5. The system of claim 4, wherein the at least two reference regions include at least two of a left region of the block to be processed, an upper region of the block to be processed, or a left-upper region of the block to be processed.

6. The system of claim 4, wherein sizes of the at least two reference regions, positions of the at least two reference regions, and/or a count of the at least two reference regions are adjusted adaptively.

7. The system of claim 4, wherein the determining the at least two candidate blocks based on matching regions corresponding to the at least two reference regions includes:

ranking the matching regions corresponding to the at least two reference regions based on cost values of the matching regions corresponding to the at least two reference regions; and determining the at least two candidate blocks based on the ranking result.

8. The system of claim 4, wherein the determining the at least two candidate blocks based on matching regions corresponding to the at least two reference regions includes:

for each of the at least two reference regions, ranking the plurality of matching regions corresponding to the reference region based on cost values of the plurality of matching regions; and determining, based on the ranking result, at least one target matching region from the plurality of matching regions; and determining the at least two candidate blocks based on target matching regions corresponding to the at least two reference regions.

9. The system of claim 4, wherein the determining the at least two candidate blocks based on matching regions corresponding to the at least two reference regions includes:

for each of the at least two reference regions, determining a minimum cost value among cost values of the plurality of matching regions corresponding to the reference region;

selecting one or more target matching regions from the plurality of matching regions corresponding to the reference region, wherein a count of target matching regions selected from each of the reference regions are same or different; and determining the at least two candidate blocks based on target matching regions corresponding to the at least two reference regions.

10. A method for image processing, implemented on a computing device including at least one storage device and at least one processor, the method including:

obtaining an image including a plurality of processed blocks and at least one block to be processed;

for a block to be processed among the at least one block to be processed, determining at least two candidate blocks among the plurality of processed blocks, including:

determining, based on one or more processing modes, one or more intermediate blocks corresponding to each of the one or more processing modes among the plurality of processed blocks; and determining the one or more intermediate blocks corresponding to each of the one or more processing modes as the at least two candidate blocks; and determining a predicted value corresponding to the block to be processed based on the at least two candidate blocks, including: for each of the one or more processing modes, determining a block weight corresponding to each of the one or more intermediate blocks that correspond to the processing mode; and determining a mode weight corresponding to the processing mode; and determining the predicted value corresponding to the block to be processed by performing a weighting processing on the at least two candidate blocks based on the block weights corresponding to the one or more processing modes and the one or more mode weights corresponding to the one or more processing modes.

11. The method of claim 10, wherein the determining at least two candidate blocks among the plurality of processed blocks includes:

determining a reference region of the block to be processed;

determining a plurality of matching regions based on the reference region, each of the plurality of matching regions corresponding to a respective one processed block; and determining the respective processed blocks corresponding to the plurality of matching regions as the at least two candidate blocks.

12. The method of claim 10, wherein the determining at least two candidate blocks among the plurality of processed blocks includes:

determining, from the plurality of processed blocks, multiple processed blocks that are within a preset distance from the block to be processed;

ranking the multiple processed blocks based on cost values of the multiple processed blocks and/or distances of the multiple processed blocks; and determining the at least two candidate blocks based on the ranking result.

13. The method of claim 10, wherein the determining at least two candidate blocks among the plurality of processed blocks includes:

determining at least two reference regions of the block to be processed;

for each of the at least two reference regions, determining a plurality of matching regions corresponding to the reference region, each of the plurality of matching regions corresponding to a respective one processed block; and determining the at least two candidate blocks based on matching regions corresponding to the at least two reference regions.

14. The method of claim 13, wherein sizes of the at least two reference regions, positions of the at least two reference regions, and/or a count of the at least two reference regions are adjusted adaptively.

15. The method of claim 13, wherein the determining the at least two candidate blocks based on matching regions corresponding to the at least two reference regions includes:

ranking the matching regions corresponding to the at least two reference regions based on cost values of the matching regions corresponding to the at least two reference regions; and determining the at least two candidate blocks based on the ranking result.

16. The method of claim 13, wherein the determining the at least two candidate blocks based on matching regions corresponding to the at least two reference regions includes:

for each of the at least two reference regions, determining a minimum cost value among cost values of the plurality of matching regions corresponding to the reference region;

selecting one or more target matching regions from the plurality of matching regions corresponding to the reference region, wherein a count of the one or more target matching regions is negatively related to the minimum cost value corresponding to the reference region, wherein a count of target matching regions selected from each of the reference regions are same or different; and determining the at least two candidate blocks based on target matching regions corresponding to the at least two reference regions.

17. A non-transitory computer readable medium, comprising executable instructions that, when executed by at least one processor, direct the at least one processor to perform a method, the method comprising:

obtaining an image including a plurality of processed blocks and at least one block to be processed;

for a block to be processed among the at least one block to be processed, determining at least two candidate blocks among the plurality of processed blocks, including:

determining, based on one or more processing modes, one or more intermediate blocks corresponding to each of the one or more processing modes among the plurality of processed blocks; and determining the one or more intermediate blocks corresponding to each of the one or more processing modes as the at least two candidate blocks; and determining a predicted value corresponding to the block to be processed based on the at least two candidate blocks, including:

for each of the one or more processing modes, determining a block weight corresponding to each of the one or more intermediate blocks that correspond to the processing mode; and determining a mode weight corresponding to the processing mode; and determining the predicted value corresponding to the block to be processed by performing a weighting processing on the at least two candidate blocks based on the block weights corresponding to the one or more processing modes and the one or more mode weights corresponding to the one or more processing modes.

* * * * *